United States Patent
Beck et al.

(10) Patent No.: US 7,539,974 B2
(45) Date of Patent: May 26, 2009

(54) SCALABLE SYNCHRONOUS AND ASYNCHRONOUS PROCESSING OF MONITORING RULES

(75) Inventors: Douglas R. Beck, Seattle, WA (US); Steven J. Menzies, Sammamish, WA (US); Raymond W. McCollum, Redmond, WA (US); Radu R. Palanca, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1213 days.

(21) Appl. No.: 10/693,072

(22) Filed: Oct. 24, 2003

(65) Prior Publication Data

US 2005/0114494 A1    May 26, 2005

(51) Int. Cl.
*G06F 9/44* (2006.01)
(52) U.S. Cl. ........................ 717/117; 717/136
(58) Field of Classification Search .................. 717/117, 717/136
See application file for complete search history.

(56) References Cited

U.S. PATENT DOCUMENTS

| | | | |
|---|---|---|---|
| 5,732,234 | A | 3/1998 | Vassiliadis et al. |
| 5,878,418 | A | 3/1999 | Polcyn et al. |
| 6,012,152 | A | 1/2000 | Douik et al. |
| 6,088,451 | A | 7/2000 | He et al. |
| 6,138,168 | A | 10/2000 | Kelly et al. |
| 6,212,581 | B1 | 4/2001 | Graf |
| 6,678,889 | B1 | 1/2004 | Burkett et al. |
| 6,871,344 | B2 | 3/2005 | Grier et al. |
| 2002/0049715 | A1 | 4/2002 | Serrano-Morales et al. |
| 2002/0059425 | A1 | 5/2002 | Belfiore et al. |
| 2002/0147726 | A1 | 10/2002 | Yehia et al. |
| 2003/0220993 | A1 | 11/2003 | Blizniak et al. |
| 2004/0031038 | A1 | 2/2004 | Hugly et al. |
| 2004/0083454 | A1* | 4/2004 | Bigus et al. .................. 717/117 |
| 2004/0111638 | A1* | 6/2004 | Yadav et al. ................. 713/201 |
| 2004/0181541 | A1 | 9/2004 | Groenendaal et al. |
| 2004/0260819 | A1 | 12/2004 | Trossen |
| 2005/0097146 | A1 | 5/2005 | Konstantinou et al. |
| 2005/0172306 | A1 | 8/2005 | Agarwal et al. |

OTHER PUBLICATIONS

Beemster; "Back-end Aspects of a portable POOL-X implementation;" Faculty of Mathematics and Computer Science University of Amsterdam; pp. 193-228; 1990.*

International Search Report dated Oct. 14, 2005 mailed Dec. 2, 2005 for PCT Application Serial No. PCT/US04/22378, 6 pages.

T. Berners-Lee et al., Uniform Resource Identifiers (URI): Generic Syntax, Network Working Group, Aug. 1998, pp. 1-38.

(Continued)

*Primary Examiner*—Lewis A Bullock, Jr.
*Assistant Examiner*—Michael Yaary
(74) *Attorney, Agent, or Firm*—Amin, Turocy & Calvin, LLP

(57) ABSTRACT

A rules runtime engine for scheduling and concurrently processing of rules. The engine efficiently runs a large number of rules in a parallel fashion. This is accomplished by authoring rules in a rule definition language, passing these rules through the translator for communication to the runtime engine and, scheduling and concurrently processing the translated instructions using the runtime engine. The engine also receives configuration data that instantiates the instructions thus, giving form to a living set of rules.

35 Claims, 15 Drawing Sheets

OTHER PUBLICATIONS

Along Lin, A New Model-Based Automated Diagnosis Algorithm, Feb. 1998, pp. 1-6.

B. Ravindran, Engineering Dynamic Real-Time Distributed Systems: Architecture, System Description Language, and Middleware, IEEE Transactions on Software Engineering, Jan. 2002, pp. 30-57, vol. 28, No. 1.

T. Roscoe et al., InfoSpect: Using A Logic Language for System Health Monitoring in Distributed Systems, Proceedings of the SIGOPS European Workshop, Sep. 2002, pp. 1-7, Saint-Emilion, France.

F. Steimann et al., Modela Based Diagnosis for Open Systems Fault Management, AI Communications, 1999, 12 pages.

V. Sugumaran et al., A Semantic-Based Approach to Component Retrieval, The Data Base for Advances in Information Systems, pp. 8-24, Summer 2003, vol. 34, No. 3.

International Search Report dated Feb. 15, 2005 mailed Mar. 4, 2005 for PCT Application Serial No. PCT/US04/22275, 5 pages.

Hewlett-Packard, Event Correlation Services Designer Overview & Features, viewed at http://www.openview.hp.com/products/ovocd/index.html, 1994-2003, 2 pages.

Hewlett-Packard, Event Correlation Services Designer's Guide, HP OpenView, pp. 1-236, Sep. 1998.

IBM Corporation, Rule Builder's Guide, Version 3.8, pp. 1-450, 2002.

Computer Associates International, Inc., Using the Performance Neugent Guide, 1999-2000, 99 pages.

Computer Associates International, Inc., Working with Neugents Guide, 1999, 35 pages.

F. Manola et al., RDF Primer W3C Working Draft Oct. 10, 2003, W3C, pp. 1-119.

J. Kunze, Functional Recommendations for Internet Resource Locators, http://www.ietf.org/rfc/rfc/ 1736.txt, Feb. 1995, 10 pages.

K. Sollins, Functional Requirements for Uniform Resource Names, http://www.ietf.org/rfc/rfc1736.txt, Dec. 1994, 7 pages.

OA Dated Oct. 20, 2008 for U.S. Appl. No. 10943452, 25 pages.

ABLE: A Toolkit for building multiagent autonomic systems IBM Systems Journal vol. 41, No. 3, 2002 pp. 350-371.

International Search Report dated Jul. 3, 2008 for PCT Application Serial No. PCT/US04/24134, 2 pages.

* cited by examiner

SCALABLE SYNCHRONOUS AND ASYNCHRONOUS PROCESSING OF MONITORING RULES

CROSS-REFERENCE TO RELATED APPLICATIONS

This application is related to the following co-pending U.S. patent applications: Ser. No. 10/692,216 entitled "MODEL-BASED MANAGEMENT OF COMPUTER SYSTEMS AND DISTRIBUTED APPLICATIONS" filed on Oct. 23, 2003; Ser. No. 10/692,660 entitled "RULES DEFINITION LANGUAGE" filed on Oct. 24, 2003; Ser. No. 10/693,588 entitled "USING URI'S TO IDENTIFY MULTIPLE INSTANCES WITH A COMMON SCHEMA" filed on Oct. 24, 2003; and, Ser. No. 10/692,432 entitled "USE OF ATTRIBUTION TO DESCRIBE MANAGEMENT INFORMATION" filed on Oct. 23, 2003.

TECHNICAL FIELD

This invention is related to system management of software applications, and more specifically, to a rules engine for asynchronous processing of rules.

BACKGROUND OF THE INVENTION

Traditional systems management is largely ad-hoc. Application developers do not have a structured framework for managing their applications and achieving high reliability. Many languages employed to facilitate such management architectures are inherently single threaded and add support for multitasking. Consequently, in those languages it is the responsibility of the user to achieve multitasking via operating system supported constructs such as threads.

The use of a rule-based mechanism provides flexibility in the software, enabling tasks and data to be easily changed by replacing one or more rules. The most fundamental primitive is the rule, which implements the logic to evaluate conditions and initiate actions. For example, a rule may watch the state of a system disk and report an error when the disk usage goes below a certain threshold. Another rule may monitor the processor utilization and report an error when the utilization exceeds a certain threshold. In a typical monitoring system, both rules would run simultaneously. If a user wishes to use a typical programming language, e.g., Visual Basic .Net, the user would have to write the code that schedules the rules so that the rules run concurrently, in addition to the logic that expresses the rule intent.

What is needed is an improved rule-based engine that facilitates simultaneous processing of large numbers of rules.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises a translator component that translates rules into instructions that facilitate concurrent processing of the instructions in a rules runtime engine. The translator component facilitates instantiation of instructions such that all states are maintained by the runtime engine. The instructions include yield statements that facilitate calling utility functions and yielding to code execution switching of the runtime engine.

In another aspect thereof, there is provided the rules engine of an innovative model-based management framework that allows developers to easily author large numbers of rules that express criteria that must be met for a system to be healthy. The framework provides a runtime architecture that facilitates scheduling and simultaneous processing of large numbers of rules.

The monitoring rules engine handles the automatic scheduling of rules thereby removing this burden from the user and allowing the user to concentrate on just expressing the monitoring logic. For example, a rule may be written that expresses the intent "if my disk is over 80% full, then alert the system administrator". Monitoring rules, just like any body of rules in the non-computer world, are implicitly processed simultaneously so that all rules are conceptually in force at the same time (unless explicitly authored otherwise). The rules engine provides the runtime architecture that facilitates this implicit simultaneous processing of large numbers of rules in such a manner as to abstract this burden of expressing rule scheduling away from the user. Consequently, all a user is required to do is author these rules without regard for scheduling, and the system will take care of the scheduling and simultaneous processing.

The rules engine supports a rules language known as RDL (Rules Definition Language). The rules monitoring system provides the following high level requirements: intrinsic parallelism — watch multiple things simultaneously; correlation; ease of use; scalability; low memory footprint and linear growth with the number of rules; low CPU utilization; and extensibility, to easily leverage and extend existing rules and runtime software.

The above requirements, especially the ease of use and intrinsic parallelism, impart an advantageous impact on the design of the rules engine. Most other languages are inherently single threaded and add support for multitasking. However, the RDL language is in stark contrast to this, since it is designed to intrinsically enable logical parallel execution of rules so that rule developers do not have to exert much effort to achieve simultaneous rule evaluations. Due to the intrinsic parallelism, this architecture supports scheduling of rules among a number of threads.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
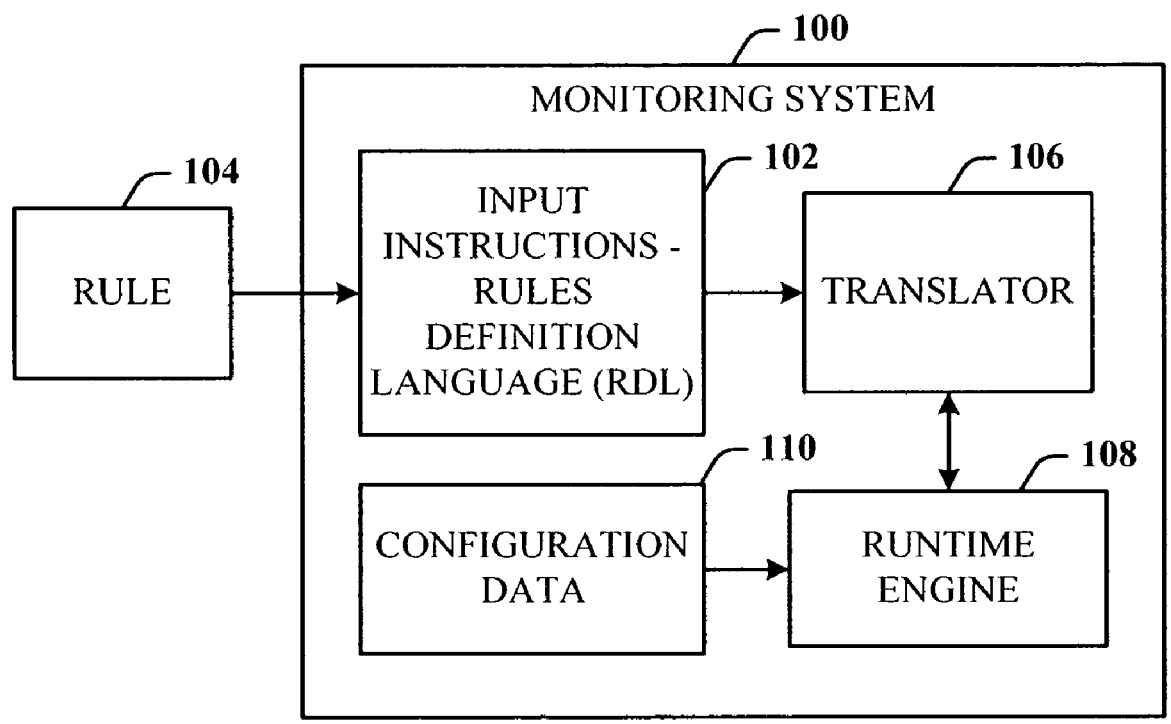
FIG. 1 illustrates a block diagram of components of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Referring now to FIG. 1, there is illustrated a block diagram of components of the present invention. There is provided a rule monitoring system 100 that facilitates running rules in a concurrent fashion. The monitoring system 100 comprises three logical entities: an input instructions component 102 (called a Rules Definition Language (RDL)) that expresses one or more rules 104 that are input to the system 100; a translator component 106 that reads the instructions 102 and transforms them into a parallel execution form; and, a rules runtime engine 108 that reads the translated instructions and facilitates efficient scheduling and parallel processing of the translated instructions.

The RDL instructions 102 enable the defining of rules for the purposes of monitoring the availability of software and hardware components. For example, a rule may watch the state of a system disk and report an error when disk usage goes below a certain threshold. Another rule may monitor CPU utilization and report an error when the utilization crosses a certain threshold. In a typical monitoring system, both rules would run simultaneously.

The runtime engine 108 takes as its input rules code expressed in RDL, as well as configuration data 110 that is used to instantiate the rule code. The rules code is organized into a series of rule types. Each type expresses the logic required to determine if a hardware and/or software target is in a desired state for the system being monitored. If the type determines that the target is not in the desired state, it typically performs some action. For example, the code below utilizes a rule type that suppresses sending a flood of error events when the system goes into an undesirable state. Note that the rule logic is demarcated and bounded by RuleType . . . End RuleType keywords. The code is translated by the translator component 106 and loaded into the rules engine 108 thus putting it into a state from which it can be instantiated. Rule code is instantiated by loading the configuration data 110 into the runtime engine 108, which configuration data specifies which rules to run, as well as the parameters required to run the rule.

Typically, if a user wishes to use a typical programming language, code would need to be written that schedules the rules to run concurrently, in addition to the logic that expresses the rules intent. The novel rules engine 108 of the present invention handles the scheduling of rules thereby removing this burden from the user and allowing concentration on expressing the monitoring logic.

In order to facilitate scheduling, rules are written in RDL and can then translated into any suitable language, for example, C#. The translated code is designed to support scheduling among large numbers of rules by introducing "yielding" semantics into the code. In this case a "yield" results in a context switch from rule code to engine code and into other rule code. This allows the rules engine 108 to multitask rules with a limited number of threads.

In the following rule, the configuration data specifies DnsRule as the rule to run, and it supplies values for the TimeLimit, CountLimit, and RestartInterval parameters.

```
RuleType DnsRule(TimeLimit As Integer, CountLimit As
Integer, RestartInterval As Integer)
    Dim Count as Integer
    Do
        Count = 0
        e = GetEvent("system", "microsoft.dns", "4514")
        Within Seconds(TimeLimit)
            Do
                e = GetEvent("system", "microsoft.dns", "4514")
                Count += 1
            Loop
        Else
            If Count > Limit Then
                DisableDnsEvents( )
            End If
        End Within
        Wait(RestartInterval)
        ReenableDnsEvents( )
    Loop
End RuleType
```

In order to run instantiated rules in a parallel fashion, the translator component 106 translates the rule code into an intermediate form that facilitates interaction with the runtime engine 108. The intermediate form is designed such that all states for the rule (arguments and local variables) are maintained by the engine 108. The rule yields to the run time of the engine 108 for code execution switching, and calls utility functions provided by the engine 108. The translated code injects periodic yield instructions into the code. In the example above, the translation will yield at the end of every loop and after the GetEvent call, at a minimum.

The code sample above maintains state information both in the form of arguments and local variables. Examples include TimeLimit and Count, respectively. When the engine 108 pauses execution of this code, the state of these variables is maintained so that it is available the next time the code is executed by the engine 108.

The Within block provides an example where utility functions on the engine 108 are utilized. In the above code, there exists a Within . . . End Within statement block that causes the engine 108 to enforce a time limit on contained code. If the contained code takes longer than the time specified to run, the engine 108 automatically causes the Else portion of the block to run while simultaneously terminating execution of the code between the Within . . . Else statements. The translated version of this block sends instructions to the engine 108 that a Within block has been entered. The engine 108 then monitors execution of the rule code and performs the appropriate actions such that the semantics described previously are manifested.

In rules monitoring, it is very common to wait until a particular event occurs, and then to act. The engine 108 supports efficient waiting on large numbers of events while making it easy to express this wait in code. The GetEvent instruction call conveniently expresses the desire to wait until something happens (bounded by a time limitation as expressed by the Within statement) and then to act on that information. The GetEvent instruction is translated such that the engine 108 puts the code to sleep and waits for the event on its behalf. When the event occurs, the code is resumed and allowed to act on the event.

In summary, the engine 108 efficiently runs a large number of rules in a parallel fashion. This is accomplished by authoring rules in RDL, passing these rules through the translator 106, and then into the runtime engine 108. The engine 108 receives configuration data that instantiates the instructions thus, giving form to a living set of rules.

It is to be appreciated that the rules engines and all components thereof can be embodied in a computer-readable medium.

Figure 2:
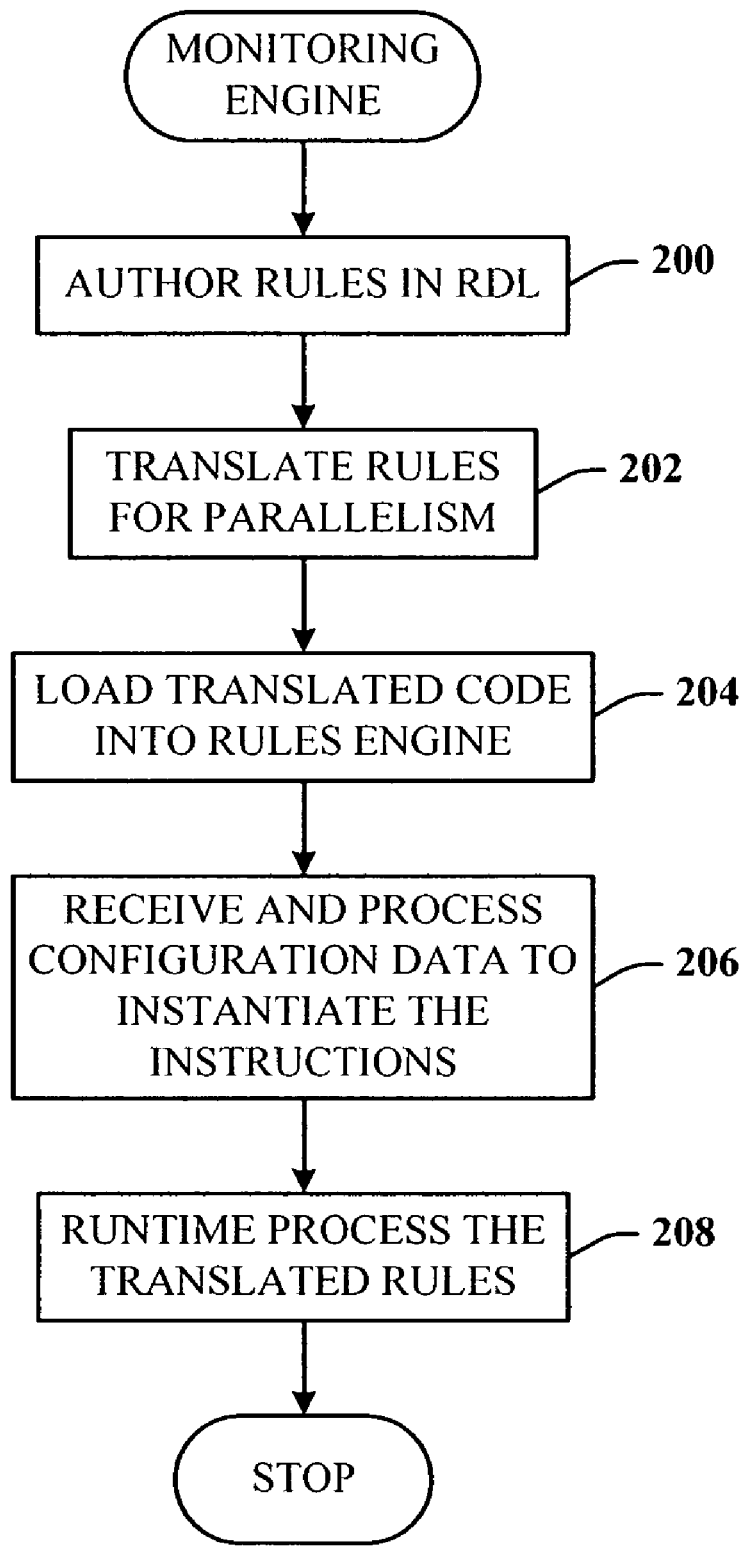
FIG. 2 illustrates a flow chart of a process of rules monitoring.

Referring now to FIG. 2, there is illustrated a flow chart of a process of rules monitoring. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, rules are received into the system and are authored in RDL. At 202, the rules are translated into an intermediate form that facilitates interaction with the rules engine. At 204, the translated rules are loaded into the runtime engine. At 206, the engine receives the configuration data to instantiate the coded and translated rule. At 208, the translated rule is both scheduled and processed by the runtime engine for parallel processing. The process then reaches a Stop block.

Figure 3:
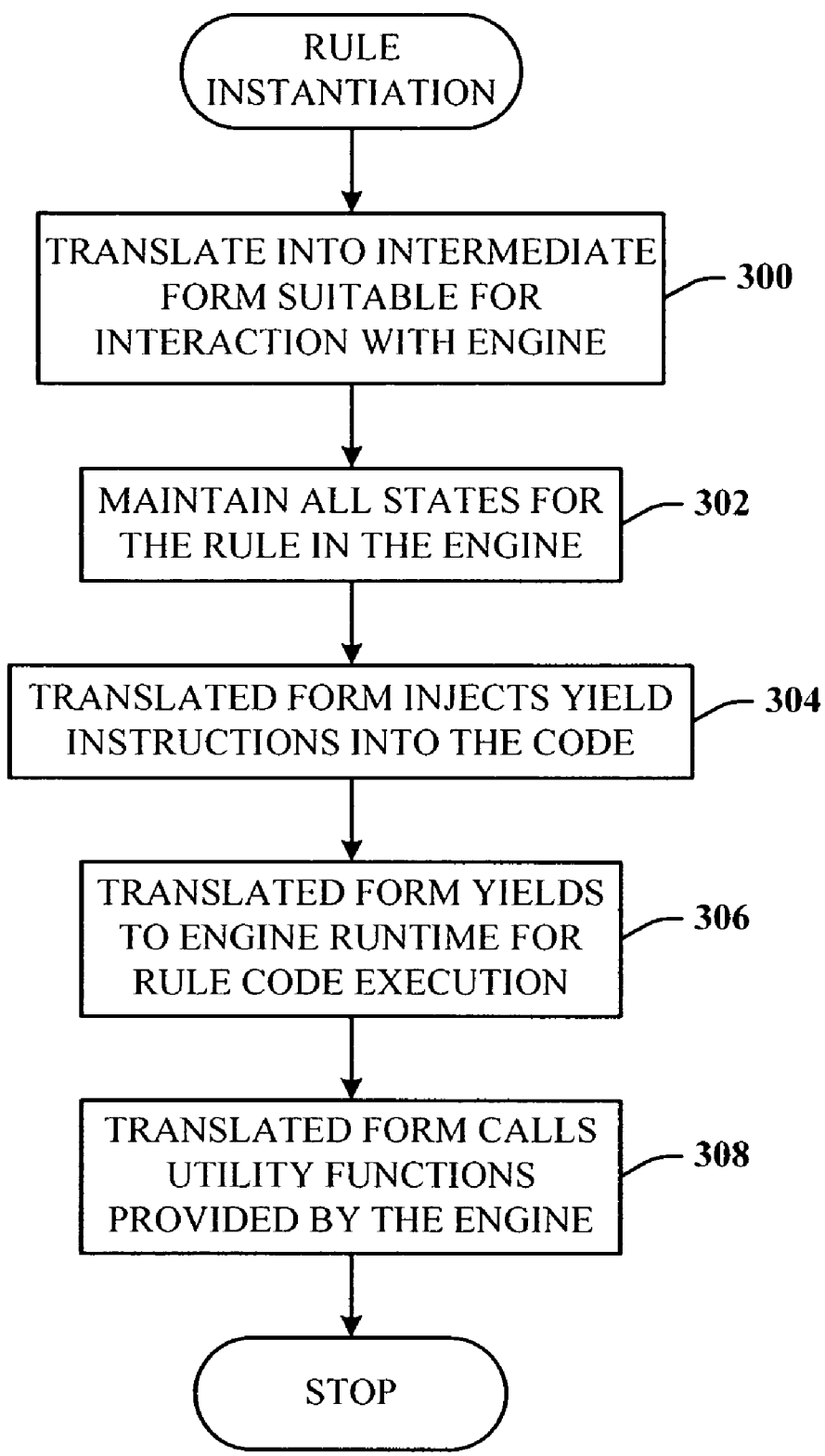
FIG. 3 illustrates a flow chart of rule instantiation in accordance with the present invention.

Referring now to FIG. 3, there is illustrated a flow chart of rule instantiation in accordance with the present invention. At 300, the rule is translated into an intermediate form for interaction with the engine. At 302, the engine maintains all states for the rule. At 304, the translated form injects yield instructions into the code. At 306, the translated form yields to the engine runtime for rule code execution. At 308, the translated form calls utility functions provided by the engine. The process then reaches a Stop block.

Translation Algorithm

During translation, depth-first traversal labels and temporary variables are generated for each appropriate node such that the order is from left-to-right and bottom-to-top. Each labeled node (not all nodes will retrieve labels) generates a temporary variable assignment, an instruction block assignment to a succeeding label, and a return statement. The translation algorithm has the benefit that it is easy to code. It generates a number of instruction blocks, and returns to the engine. The following illustrates translation of a simple assignment statement (abbreviated notation is used for readability).

r Ln — Set Instruction Block to Ln and return.

RDL:

myObject.Property = a + b − c

Translation of the assignment statement is as follows:

```
case L1:
    T1 = myObject;
    r L2;
case L2:
    T2 = a;
    r L3;
case L3:
    T3 = b;
    r L4;
case L4:
    T4 = c;
    r L5;
case L5:
    T5 = T3 − T4;
    r L6;
case L6:
    T6 = T2 + T5;
    r L7;
case L7:
    T1.Property = T6;
    r L8;
```

Rules written in RDL can be grouped into modules. Modules can be translated into classes with a compiler, for example, a Visual Basic StandardModuleAttribute, as shown:

```
[Microsoft.VisualBasic.CompilerServices.StandardModuleAttribute]
public class MyRules
{
    ...
}
```

The translated code is broken down into a series of instruction blocks. The instruction blocks are separated into switch-case blocks and the rule frame has a field that maintains the current block. The instruction block is the equivalent of an MSIL (Microsoft Intermediate Language) address, although the translation blocks do not have the same level of granularity as in MSIL. MSIL is a language used as the output of a number of compilers (e.g., C#, VB, and .NET). Each instruction block represents a work item in the sense that all code within the block is executed as a unit so that yielding to the engine occurs between blocks.

The following code shows a simple example of how instruction blocks are utilized. The rule shown below is broken down into three distinct blocks. Each block is terminated with a return statement. Before the rule returns to the engine, the rule frame is updated with the instruction block that should be executed next upon reentry into the rule. If a break occurs within the switch statement, as shown in the second block, this terminates the rule.

A rule invokes IExecutionStack.SetCallerFrame( ) prior to termination so that the engine will enter the caller rule next.

```
[Startup]
public static void Rule2(IExecutionStack stack)
{
    switch (SC.InstructionBlock)
    {
        case 0:
            LocalFrame_Rule2 lf = new LocalFrame_Rule2( );
            SCL = lf;
            ((LocalFrame_Rule2)SCL).i = 0;
            SCIB = 1;
            return;
        case 1:
            if ( !(((LocalFrame_Rule2)SCL).i <= 10) )
            {
                break;
            }
            SCIB = 2;
            return;
        case 2:
            ((LocalFrame_Rule2)SCL).i++;
            SCIB = 1;
            return;
    }
    stack.SetCallerFrame( );
}
```

All rules are translated such that they have a signature, e.g., the following signature:

```
public static void RuleName(IExecutionStack stack)
```

Return values and parameters are all located on the stack. As shown, all rules are implemented as static functions that are members of the module within which they were defined. Modules are translated into classes, as discussed elsewhere herein.

Rule names exactly match the name as expressed in the RDL file. Following is an example of a rule name that is fully qualified name:

```
Namespace.ModuleName.RuleName
```

Startup rules are marked with a startup attribute <Startup>. All startup rules are invoked by the rule engine upon successful loading.

```
<Startup>
Rule MyRule
End Rule
```

The translated startup rule is as follows:

```
[Startup]
public static void MyRule(IExecutionStack stack)
```

If a ValueType is passed ByRef to a function via Start, then it only receives a copy via the mechanism below. This means that the original copy in the caller does not change.

Figure 4:
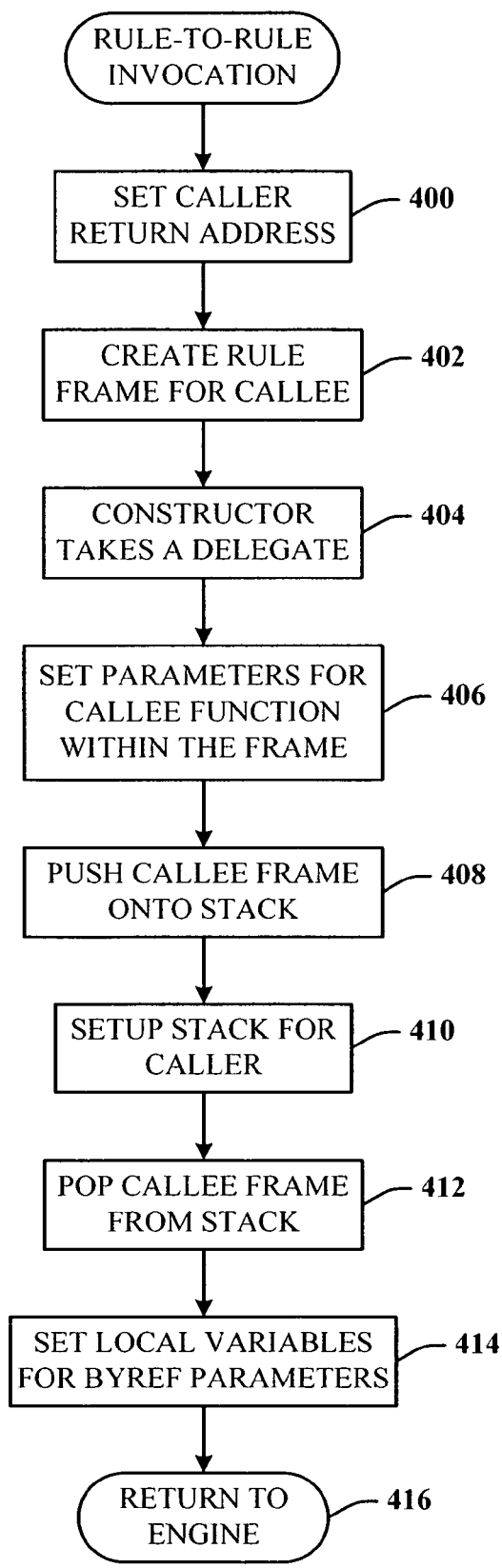
FIG. 4 illustrates a flow chart of the process for rule-to-rule invocation.

Referring now to FIG. 4, there is illustrated a flow chart of the process for rule-to-rule invocation. RDL accommodate one rule invoking other rules. Rule-to-rule invocation involves the following steps in translated code. At 400, the return address is set for the caller (a case block value). At 402, the rule frame ("RuleFrame") associated with the callee is created. At 404, the constructor for the rule frame takes a delegate to the translated function and is used by the engine to make the actual call. At 406, the parameters for the callee function are set within the frame. At 408, the callee frame is then pushed onto the stack, and flow returns to the engine. Steps 400-408 represent a prolog. At 410, the stack is setup of the caller. At 412, the callee frame is popped from the stack. At 414, the local variables are set for any ByRef parameters. Flow then returns to the engine, as indicated at 416. Steps 412 and 414 represent an epilog.

RDL expressions map approximately one-to-one with the translated code, except under the following conditions: when the expression contains a rule invocation; and when the expression contains an asynchronous function invocation. When the expression contains these types of terms, the expression is factored into a three-address code. The compiler walks the tree in a top-down and left-to-right manner and, emits primitive translations at each node. As an abstract syntax tree (AST) is traversed, labels and temporary variable designations are obtained.

RDL contains two scopes for variables: arguments, and local variables. When an expression evaluation is fully reduced, assignment can be made to either arguments or local variables, and will be translated.

Every translated function has an associated custom RuleFrame derived class. The derived class contains members that directly correlate to the parameters that are passed into an RDL function. This is translated into a function.

When a function is invoked, the members in the derived RuleFrame are set appropriately in the prolog, as discussed previously, and the RuleFrame is pushed onto the stack. Upon return, the ByRef members are read and transferred to the caller frame appropriately in the epilog, as described previously.

Polling is supported in RDL. In order to support polling, the RuleFrame class maintains a stack of polling structures. The stack allows for nesting of polls within a single function. The engine schedules only according to the polling structure for the current frame and the polling structure that is at the top of the stack. In order to configure for polling, a polling structure is setup at the top of the stack. A polling instruction is only called once per polling block as it creates a polling structure and pushes it onto the stack. Upon block entry, the time span is set. The Return instruction is then set, and flow returns to the engine.

The engine then checks to see if polling has been established, and schedules the execution stack for execution. Each time the polling interval is set, a flag is set within the frame to indicate that polling has been established. If the polling interval has not changed, the polling flag can be set manually. The engine resets the flag after scheduling. Therefore, the emitted code never resets the polling flag. The polling structure is then popped from the polling stack upon exit.

The RDL uses two data types: a reference type; and, a value type. RDL reference data types translate one-to-one to programming language counterparts (e.g., C#), and reside either within a local frame or rule frame, depending on their scope. The scopes are discussed hereinbelow with respect to variables. Values types present numerable issues surrounding boxing, since they cannot be passed around by reference. They will be boxed within a reference type.

Variables have two distinct localities in RDL. Variables are either scoped within the parameter list for a function or scoped within the function itself. If the variables are part of a parameter list, they are generated within a derive RuleFrame instruction. If the variables are declared within a function, then they reside within the local frame of the function. Local frames are highly specific to a container function. The base RuleFrame class maintains a reference to the local frame.

Analyst invocation is identical to any conventional object invocation. These invocations come in two flavors: synchronous and asynchronous. A synchronous invocation is a straightforward call where the parameters and return values for the function are the variables (or literals) on the local frame. The synchronous invocation looks as follows:

```
((LocalFrame_MyRule)SCL).Value =
((LocalFrame_MyRule)SCL).objPerformanceCounter.NextValue( );
```

In some cases, method invocations are asynchronous. These calls follow a standard asynchronous design pattern. The return address is setup, and the frame is marked as deferred. The asynchronous BEGIN operation is then invoked for the object.

```
((LocalFrame_MyRule)SCL).asyncResult =
    ((LocalFrame_MyRule)SCL).asyncDelegate
    BeginInvoke(
        10000,
        out ((LocalFrame_MyRule)SCL).MethodOutput,
        stack.RuleServices.AsynchronousDispatcher,
        stack
    );
```

The last two parameters provide the asynchronous callback, which are the dispatcher method for the rule engine and the execution stack for the rule. The last two parameters are the same and required for all asynchronous calls. The first set of parameters varies depending on the nature of the asynchronous component. When the asynchronous call completes, a thread is dispatched to the engine dispatch handler that ultimately passes the call back to the rule.

Loops

As described previously, rules are broken down into a series of instruction blocks. Consequently, looping decomposes into conditional checks, instruction block setting, and returns to the engine. This is analogous to MSIL where branching instructions move execution to a different address with one important distinction. Prior to jumping, rules always return to the engine so that non-preemptive scheduling may be accomplished. Note that a return to the engine does not necessarily mean that the task will be switched out, as the engine may return immediately to the task if conditions warrant.

Looping constructs map out in an analogous way as in MSIL, such that all looping constructions check the condition at the end of the constructions block so that they all share the same translation. This means that for a WHILE loop the instructions prior to the loop cause an initial branch to the end of the block so that the condition is checked upon initial entry.

The RDL language is designed to intrinsically support multitasking among many rules. Consequently, the translated code is constructed in such a manner as to allow the rules engine to switch among a large number of rules with a limited number of threads so that the resultant architecture essentially boils down to a non-preemptive scheduling system.

Scheduling

Prior to describing the basics of a scheduling solution, a clear description of the problem is warranted. Consider a rules document that contains a large number of rules, and within the document are the following three rules, as shown below, called CheckCDiskSpace, CheckCounter, and CreateEvent. Also consider for the sake of simplicity, that the rules engine is configured to utilize only a single thread for multitasking among a set of tasks. (Note that CheckCDiskSpace contains an attribute that marks it as a startup rule and that it should be run in parallel with other rules similarly marked.) Conceptually, the rules engine processes the compiled assembly and constructs a list of all the rules that must be run in parallel, e.g., CheckCDiskSpace shown below.

Each rule is then placed in a task execution queue for consumption by a rules engine thread. In the case of the rules shown below, CheckCDiskSpace is placed in the initial execution queue. At some point in time, a thread sequences the rule and begins to execute CheckCDiskSpace. At some later point in time, the thread encounters CheckCounter. The thread invokes this internal function by invoking the function synchronously just as it appears, implying that the translated program language code (e.g., C#) will appear almost exactly as shown in the RDL sample below.

However, this answer creates an issue for the rules engine. Suppose that a rule contains a continuous loop of the form "While — Sleep(time) — End While", and that a thread enters this loop. Once this type of construct is encountered, the thread enters a situation from whence it cannot return, and hence, be scheduled for other tasks. Less serious deviations occur when the callee consumes an inordinate amount of time doing calculations. Whatever the cause may be, the end result is task starvation. The translated code must facilitate task switching so that threads can be scheduled between tasks for fair processing. Therefore, the translated code facilitates ease-of-cooperative multitasking so that a function execution state may be saved (arguments, local variables, and current instruction) and reconstituted at a later time.

```
<Startup(Parallel:=True)>
Rule CheckCDiskSpace
DIM Uri as String
DIM Threshold as Double
DIM Value as Double
Uri    = "\\LogicalDisk(C:)\\% Free Space"
```

-continued

```
    Threshold = 40
    If CheckCounter(Uri, Threshold, Value) Then
        CreateEvent( Value )
        Return False
    End If
    Return True
End Rule
Function CheckCounter(ByVal URI as String, ByVal Threshold
as Double, ByRef Value as Double) as Boolean
    Value = GetPerfCounter(URI)
    If X > Threshold Then
        Return True
    End If
    Return False
End Function
Function CreateEvent( ByVal Counter ) as Boolean
    DIM Event as String
    Event = "<Event> CounterEvent" + "<Counter >" + Counter +
    "</Counter>" + "</Event>"
    RaiseEvent( Event )
    Return True
End Function
```

Task Switching

A cooperative multitasking system requires that the scheduled tasks relinquish control of a thread so that other tasks may be run. Since the translation of RDL code is controlled, a determination is made as to where each task will relinquish control. A task relinquishes control simply by returning in the normal fashion from the currently executing function. However, prior to returning, each task will update a stack frame that contains information about parameters, local variables, and where in the function to jump upon reentry (details on the stack frames appear hereinbelow). Since a task switch involves a function return, the system stack is unwound and lost. Consequently, the system stack can be restricted to a depth of one such that function calls between rules involve a return to the runtime prior to a callee function entry. When a function returns to the runtime, one of two execution pathways can occur. Either the runtime immediately enters the callee function and begins execution on the same thread, or the task stack frame is pushed onto the work item queue and thus, cause a task switch.

Stack Frames

In order to facilitate task switching between rules, the RDL code is translated such that the resultant code contains instructions for constructing call frames. These frames contain function parameters, current instruction block, current function, and local variables. Whenever a function is called, these frames are constructed and linked, thus, comprising a call stack. Maintaining such a call stack separates the instructions from the computational state making the functions stateless and facilitating task switching.

The RuleFrame structure serves as the base structure from which function specific frame structures are created. The RuleFrame structure is created and populated whenever a caller function invokes a callee function, and has the following characteristics: m_RuleDelegate is a delegate to the function for this frame; m_InstructionBlock is the currently (or next to execute) executing instruction block; m_Mode is the way in which the function should be invoked (synchronous or asynchronous); m_RetVal is the return value of the function; m_LocalFrame contains the local variables to the function; and m_ParentFrame is the caller function of this frame.

Every function has a customized frame that derives from the RuleFrame structure. The following illustrates what the frame would look like for the CheckCounter function shown above.

```
class Frame__CheckCounter : RuleFrame
{
    string URI;
    double Threshold;
    DoubleRef Value;
}
```

Each caller is aware of every callee derived call frame structure. The local frame structure is also specific to the function to which it applies. The following illustrates the local frame for the CheckCDiskSpace function.

```
class CheckCounter1LocalFrame : LocalFrame
{
    StringRef m__Uri;
    DoubleRef m__Threshold;
    DoubleRef m__Value;
}
```

As indicated hereinabove, RDL supports the capability to have rules invoked on a periodic basis through polling. Polled rules are expected to be used extensively and consequently, it is likely that there could be thousands of these rules. The RDL code fragment below illustrates a typical polled rule.

```
[Startup]
Rule SetupDiskChecks
    Run CheckDisk("c:", 500000)
    Run CheckDisk("d:", 600000)
    Run CheckDisk("e:", 1230000)
End Rule
[Poll(Minutes(30))]
Rule CheckDisk(Drive as string, Limit as Uint64)
    Dim FreeSpace as Uint64
    FreeSpace =
RDL.Get("#microsoft/os/storage/disk/{0}/freespace", Drive)
    If FreeSpace < Limit Then
        RDL.RaiseEvent("Disk drive {0} is below the
limit!", Drive)
    End If
End Rule
```

The rule above is called by a thread from the rule engine, the calculations are performed within the rule, and then logically sleeps for thirty minutes prior to its next invocation. The rule engine is required to support potentially thousands of these types of rules while minimizing the central processor utilization. Consequently, the engine implements an algorithm for scheduling and spreading out the invocations of polled rules. The problem of de-synchronizing polled rules is most acute during startup where it is expected that large numbers of rules will become activated. If the polls are not spread out in time, then processor utilization will spike periodically whenever a group of tasks become due. The shorter the polling interval, the more acute the issue becomes.

Currently, the engine is expected to support polling intervals at the granularity of a second. In order to keep the processor utilization low, tasks are artificially spread apart with a time interval such that the target utilization is roughly five percent. The size of the interval is set such that processor intensive calculation of the task must takes no more than five percent of the interval. For example, suppose that tasks require, on average, three milliseconds of processor time on a single processor machine with a 1 GHz processor. The task spread interval would have to be about sixty milliseconds in order to keep the utilization at five percent. This means that the rules engine could only support a total sixteen rules for a 1-second poll before the utilization begins to climb above five percent.

Returning to the example above, it becomes apparent that a polled rule can be initiated at any time (not just at startup as shown above). As a result, without some analysis of the code the engine will have no idea when a polling request will be made. For example, one thousand 30-second polling rules could request a poll all at the same time or the requests could be spread out over twenty minutes depending on how the rules are written. Even if the poll requests arrive uniformly over a twenty minute period, there is no guarantee that the engine will not end up in a state where a large number of rules are invoked at the same time in a periodic manner causing an ungainly spike in the utilization every thirty seconds.

In order to minimize this possibility, the engine utilizes the following heuristic to minimize synchronized rule invocations. The engine schedules all tasks in fixed increments of time from some arbitrary absolute time. The schedule spreading occurs when a rule explicitly calls a schedule function.

```
RuleEngine.Schedule( RuleFrame ruleFrame, int Interval,
    bool firstInvocation )
```

If firstInvocation is true, then the spreading algorithm is applied. Otherwise, the rule is immediately scheduled for the interval specified. First invocations are scheduled as follows:

```
Interval > m_DefaultInterval ? t_Interval =
m_DefaultInterval : t_Interval = Interval
n = (int)( 1 + ( t_CurrentTime – m_ReferenceTime ) /
m_DefaultInterval )
ScheduledWait = m_ReferenceTime + n * m_DefaultInterval –
CurrentTime +   Random.Next(t_Interval/MinSpread),
``` where, m_MinSpread is the minimum scheduling interval between tasks and is fixed during runtime (on the order of tens of milliseconds); m_ReferenceTime is a fixed time from which all polls are based (the rule engine sets this value at startup); and, m_DefaultInterval is an interval of time over which to spread polled invocations (this is on the order of minutes, and should be sufficiently large to spread thousands of polls without causing undue delays in initial invocations).

The calculation uniformly spreads polling invocations over a discrete set of time slots for a given polling period. If the polling interval is very large, then the invocations are spread over a smaller sufficiently large interval in order to prevent undue delays in startup intervals. If small polling intervals are not spread out uniformly over their respective periods, then a clustering affect can occur among rules with the same polling interval as they fire in phase.

Initial Rule Startup

During startup, the rules engine utilizes reflection, and builds up a list of tasks to run based upon those rules marked with the Startup attribute. When the task list has been built, then engine utilizes its scheduling function to spread out the initiation of all the rules. Rules will be started up in a series of batches such that each batch is scheduled within a time configured time interval (i.e., the m_DefaultInterval defined above). This default interval is configurable and may be dependent on the number of processors used in the computer-the more processors, the smaller the interval.

Asynchronous Function Invocation

Many analysts are driven entirely by the rules engine. These analysts are created by a rule, fed data by the rule, and then queried for the result of the calculation. The typical cycle occurs as follows. The analyst is created and initialized, such as the rising slope. On a polled basis, the operating system is queried for a performance counter and passes this data to the analyst. The analyst is then asked if it has enough data to complete the calculation. If yes, then the results are obtained and processed. If not, the next poll is waited for, and the cycle is begun anew. The following RDL fragment illustrates this cycle.

```
Rule CheckDiskSpace
    Dim Obj as RisingSlope = new RisingSlope(-20, 5)
    Dim Sample as Double
    Dim Result as Double
    Poll Seconds(60)
        Sample = GetPerfCounter("\LogicalDisk(C:)\% Free Space")
        Obj.Add( Sample )
        If Obj.ThresholdBreached( ) Then
            Result = Obj.GetSlope( )
            //Send an event
        End If
    End Poll
End Rule
```

This cycle is completely synchronous on the part of the analyst and does not require any queues for either the engine or the analyst.

Another alternative is to make the analyst asynchronous and have it notify the engine when data is available. The engine would then retrieve the data upon notification and process it. The following code illustrates the idea.

```
Rule CheckDiskSpace
    Dim Obj as RisingSlope = new RisingSlope(-20, 5)
    Dim Sample as Double
    Dim Result as Double
    Run WaitForBreach( Obj )
    Poll Seconds(60)
        Sample = GetPerfCounter("\LogicalDisk(C:)\% Free Space")
        Obj.Add( Sample )
        End Poll
End Rule
Rule WaitForBreach( ByVal RisingSlope Obj )
    Double Result
    Do
        Result = Obj.GetSlope( )
        //Send an event
    While True
End Rule
```

This pattern requires that the engine invoke GetSlope in an asynchronous manner so that the thread is not blocked. In this pattern, the GetSlope call is broken down into two steps with a result object to correlate the calls. The first step involves a Begin operation method call where the engine will pass in a call-back function along with the call frame, and receive an asynchronous context object in return. At some point in time the analyst invokes the call-back and supplies the asynchronous object. The engine obtains its context from the asynchronous object and schedules the rule for execution with the thread pool. When the rule executes it invokes the analyst end operation, passes in the asynchronous object, receives the call results, and processes those results.

Since the analyst is continually running in this scenario, it is possible that it could generate more results while one is being processed. In this event, the analyst can maintain a queue and wait for a Begin Get request from the rule. In many cases, this type of model is not required since the engine typically feeds the analyst. One exception to this receives its data independently of the engine.

Model-Based Management Architecture

Figure 5:
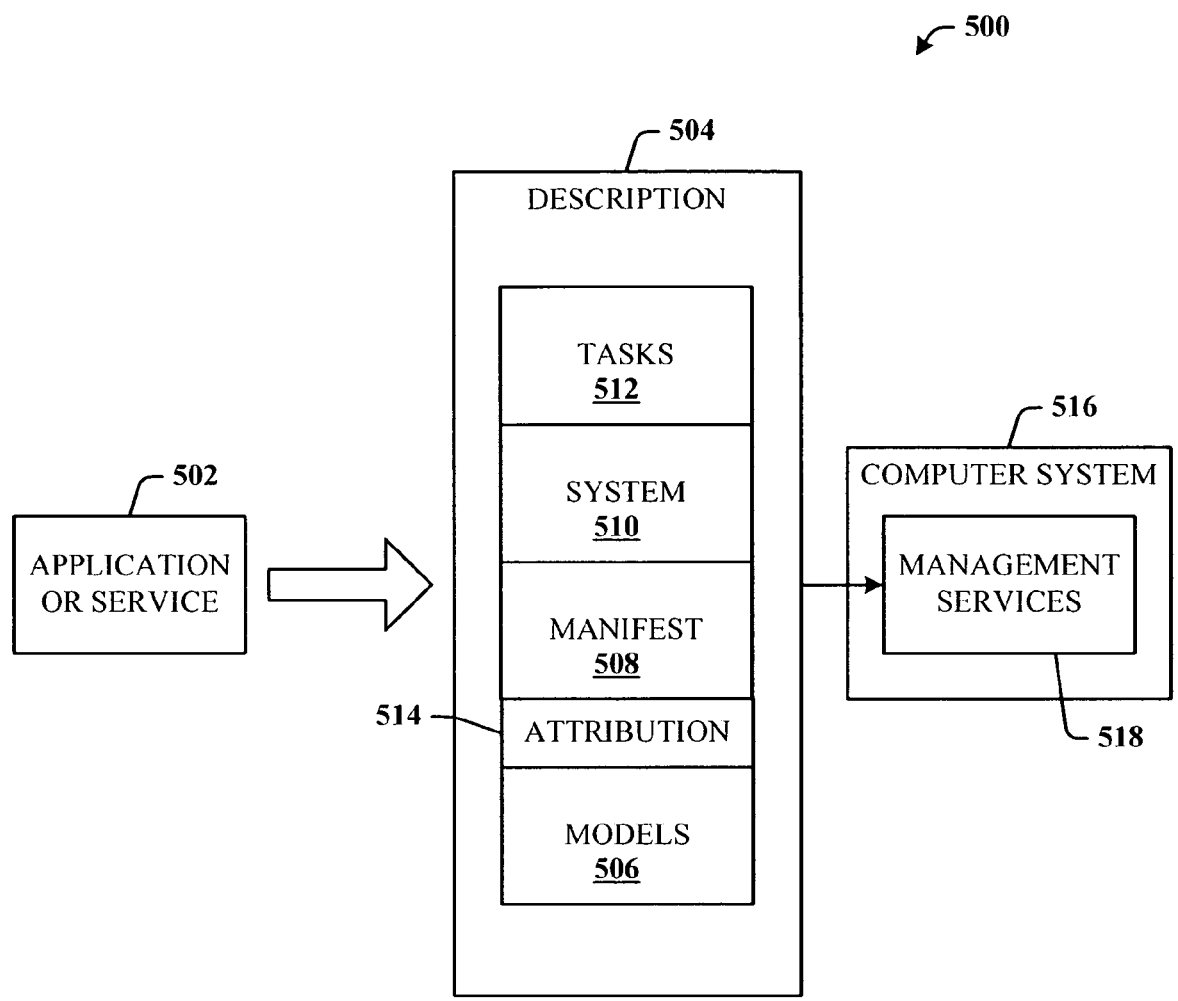
FIG. 5 illustrates a model-based management architecture utilizing a rules engine in accordance with the present invention.

Referring now to FIG. 5, there is illustrated a model-based management architecture 500 utilizing a rules engine in accordance with the present invention. The model-based management approach allows a developer to describe an application or service 502 in terms of its constituent components and desired states in terms of functionality, configuration, security, and performance. Thus, an application or service description 504 facilitates describing the application or service 502 in terms of one or more manageable components, including at least a models component 506, manifest component 508, system component 510, and tasks component 512. The model-based management system 500 utilizes an attribution component 514 to facilitate attribution of the source code from the model component 506 to the manifest component 508.

A computer system 516 uses the application or service description 504 at installation of the application 502 to configure management services 518 associated with the computer operating system. The management services 518 then help ensure availability of the application or service 502 through automatic management actions such as configuration management, problem detection, diagnosis, and recovery. The model 506 also describes common tasks that the administrator may perform. The model-based management architecture 500 facilitates a lower total cost of ownership, and is used across the application lifecycle from development, to deployment, operations, and business analysis. Generally, a developer begins by creating one or more models of the application or service in terms of how the application works, its constituent components, the desired health states that the developer defines and chooses to monitor, configuration aspects at least with respect to how it will be installed and what settings the application or service will require and, administrative tasks and the scheduling thereof. The source code of the model is then attributed (or tagged) at specific areas for manifesting.

The models are rolled up into instrumentation manifests. The models tend to be in the form of text documents, spreadsheets documents, etc., structured documents that are either transformed through codes, scripts, tools, or manually into the manifest that tend to be more XML schemas, and further machine processed and machine read. That is to say the models documents are more human readable and the manifests are more machine readable. The manifests are then used to facilitate system management.

The attribution subcomponent 514 is associated with source code attribution. Attribution is used to express management information along with the code to which it pertains. Without attribution, two separate pieces of code would need to be written — one for normal application processing and one to expose it to management. Attribution within the source code is used to describe which parts of the code (called probes) should be used to determine and/or correct health, as well as specify when to execute monitoring rules. Probes can be exposed from components that access existing operating system APIs (Application Program Interfaces) or from components loaded inside running applications or services. In both cases, the developer adds attribution to indicate what subset of the types within the components should be exposed and how they should be identified. Probes are identified using URIs (Uniform Resource Identifiers) within an administrator namespace. At runtime, a probe is retrieved by identifying it from within a catalog of all probes on the computer, and following the associated information about the probe.

Source code attribution can also provide instructions to the monitoring service, for example, to attribute functions that should be used as monitoring rules and loaded at startup, polled periodically, run on an event, etc. This attribution can be automatically processed and put in the manifest the same way as the instrumentation. Thus, attribution is not just instrumentation, but for other management purposes as well. Attribution can also be used to support administrative tasks and/or corrective actions.

Figure 6:
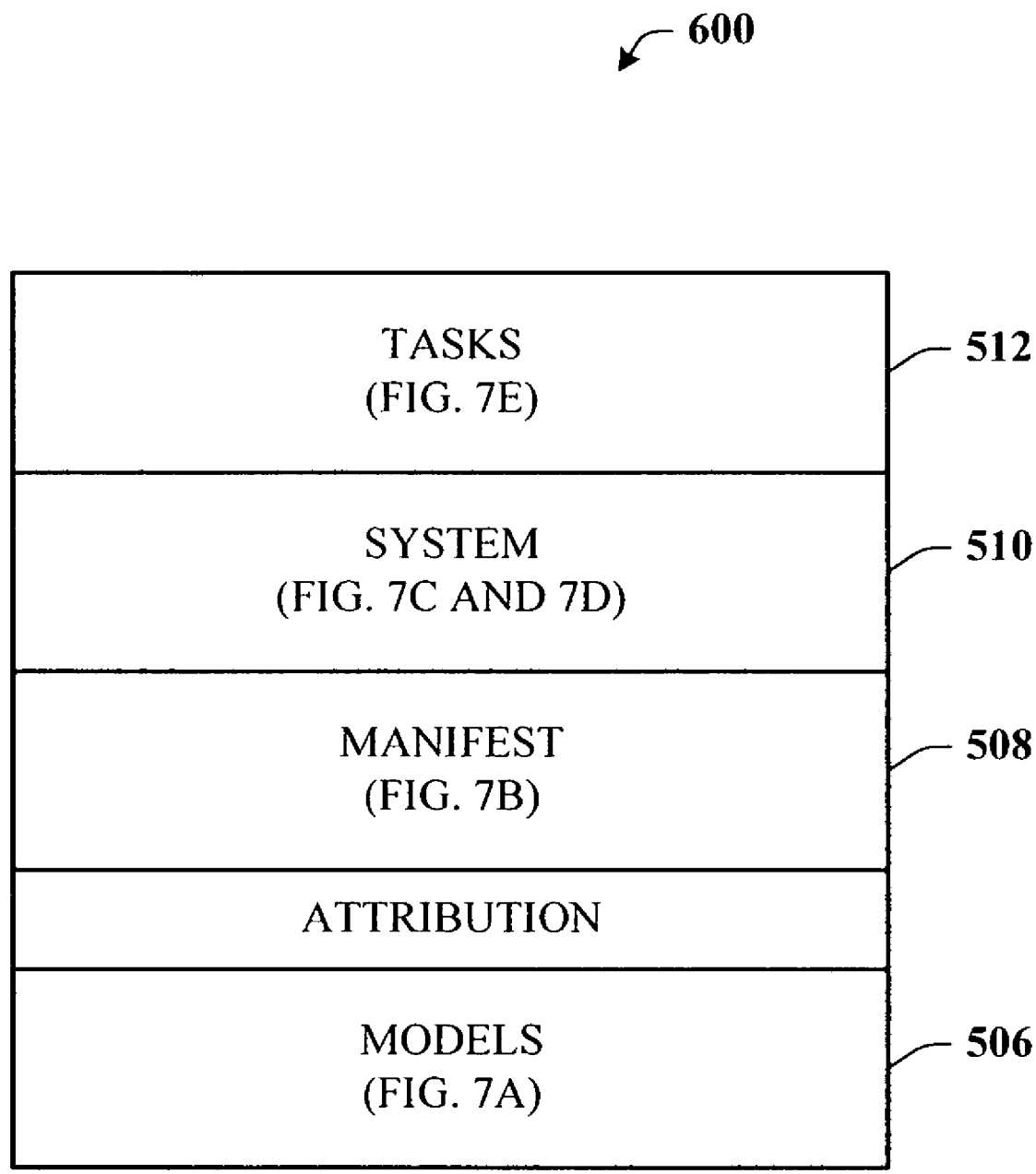
FIG. 6 illustrates a drawing map related to describing principal components of the model-based management architecture.

Referring now to FIG. 6, there is illustrated a drawing map 600 related to describing principal components of the model-based management architecture 500. The architecture includes the models component 506 that is described in relation to FIG. 7A, the manifest component 508 that is described in relation to FIG. 7B, the system component 510 that is described in relation to FIG. 7C and FIG. 7D, and the tasks component 512 that is described in relation to FIG. 7E. Attribution has already been described, and will be addressed throughout the specification.

Figure 7B:
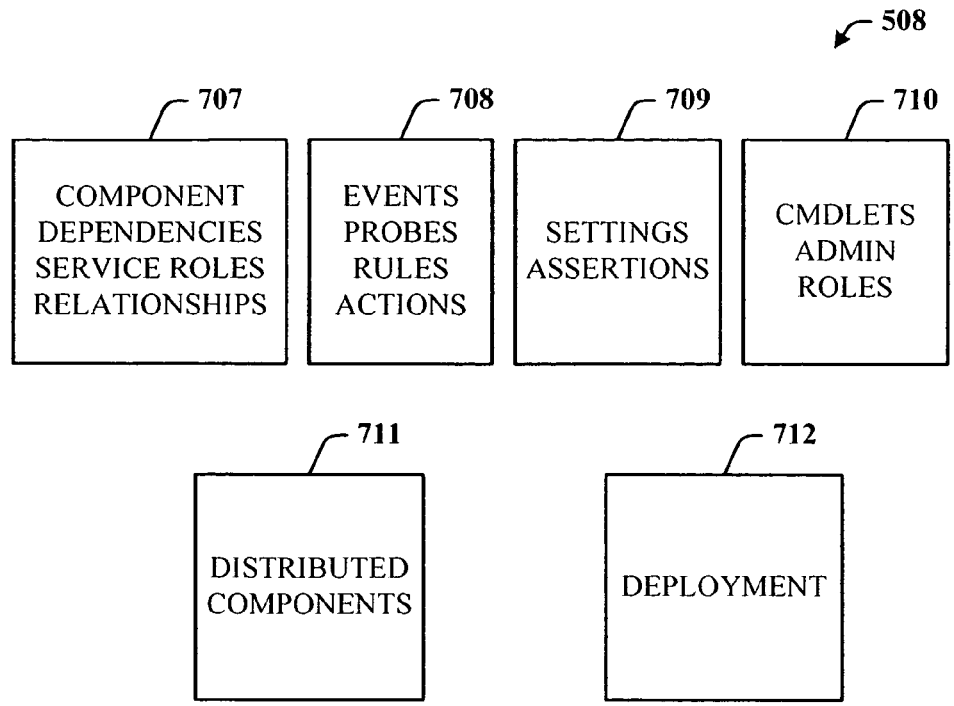
FIG. 7B illustrates blocks associated with the manifest component of the model-based management architecture.
Figure 7A:
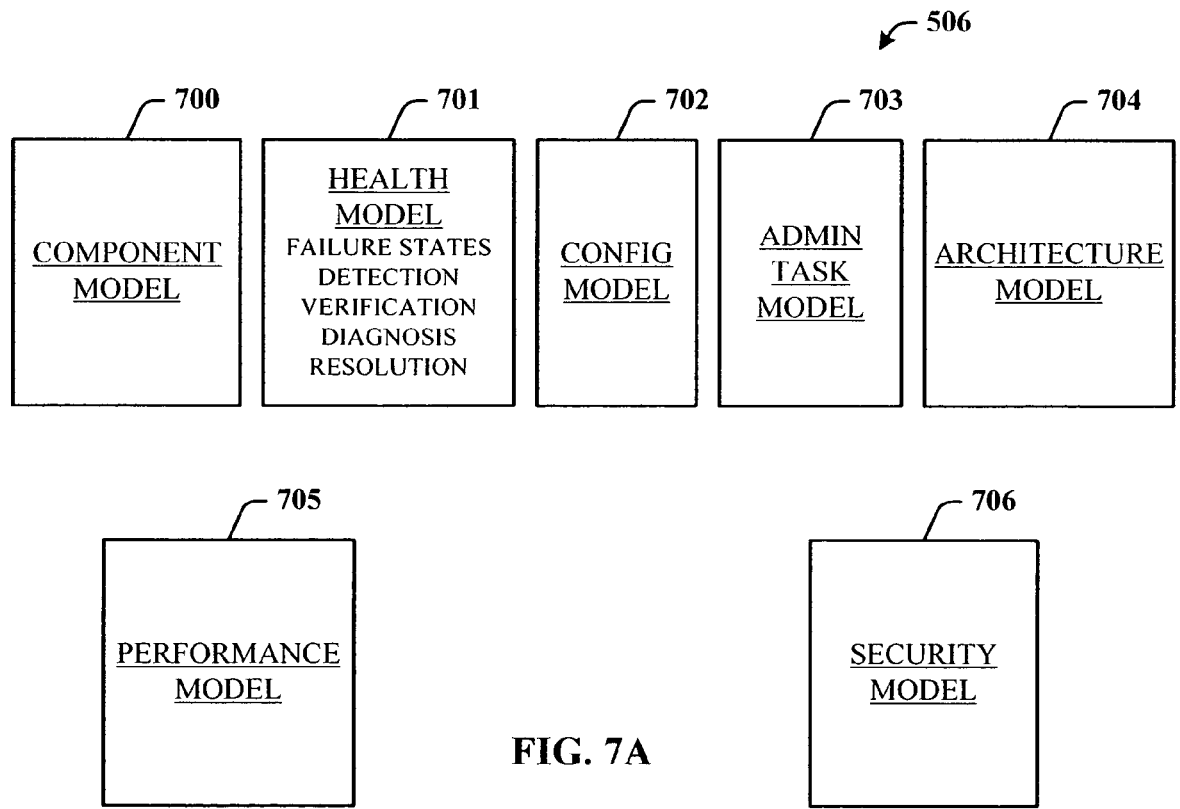
FIG. 7A illustrates blocks associated with the models component of the model-based management architecture.

Referring now to FIG. 7A, there are illustrated blocks associated with the models component 506 of the model-based management architecture. Models are developed for the components making up an application, health states and recovery, configuration settings, and administrative tasks.

In support thereof, there is a component model subcomponent 700 for modeling any and all components of the system (and relationships, dependencies and service roles associated therewith). The component model 700 describes the files, configuration, different ways the application can be installed, and more.

A health model subcomponent 701 can be developed to describe the various failure states, and the way that the application or service could fail. The health model 701 describes the steps that would need to be taken to automate the health features. The health model 701 represents at least the failure states, detection the states, verification, diagnosis, and resolution of the system states. The health states can be described in terms of what criteria must be met to be considered completely healthy, to completely fail and any intermediate states, e.g., degraded performance, partially working, some of the customer functionality is working, and is the application or service delivering the expected level of service. Health also considers that functionality could be fine, but performance is substandard indicating that the application or service is not healthy.

A configuration model subcomponent 702 is associated with modeling the system configuration. The configuration model 702 is used to describe the application settings, user controls, default values, various restrictions, etc. An administrative task model subcomponent 703 is associated with modeling administrative tasks, and includes the actions a user can take upon a system, such as start, stop, add user, add database, and corrective actions that can be called from the health model 701. The model 702 enumerates all that can be done with the application or service. An architecture model 704 is used to describe distributed environments and associated deployment, normally associated with, for example, a large network of clients having the same or similar hardware and software settings and configuration, and distributed databases. Thus, a local application may be dependent on a remote disk array. At deployment, the disk array needs to be instanced at the deployment level with a manifest and using URIs. Since the URI is machine independent, distributed systems can also obtain the benefits of the model-based management system. A performance model 705 can be developed to describe the way in which the developer wishes to use metrics for monitoring performance of the application or service. This is closely related to health of the system.

A security model 706 can be generated that describes the types of security associated with the application or service.

Note that the number of models provided herein is not exhaustive, since the developer can provide many different models for managing various aspects of the application or service.

The subject model-based system can employ various artificial intelligence based schemes for carrying out various aspects thereof. For example, with respect to models, a process for determining what models can be utilized for a given instance or implementation can be facilitated via an automatic classification system and process. Moreover, such classifiers can be used to build operational profiles of the system that start to detect system patterns, and learn what is a good state, a bad state and, successful and unsuccessful transactions. This information can then be fed back into the corresponding model and used as an updated model for a follow-on system. Such classification can employ a probabilistic and/or statistical-based analysis (e.g., factoring into the analysis utilities and costs) to prognose or infer an action that a user desires to be automatically performed. For example, a support vector machine (SVM) classifier can be employed. Other classification approaches include Bayesian networks, decision trees, and probabilistic classification models providing different patterns of independence can be employed. Classification as used herein also is inclusive of statistical regression that is utilized to develop models of priority.

As will be readily appreciated from the subject specification, the model-based system can employ classifiers that are explicitly trained (e.g., via a generic training data) as well as implicitly trained (e.g., via observing user behavior, receiving extrinsic information) so that the classifier(s) is used to automatically determine according to a predetermined criteria, for example, what initial settings to use for a given implementation, and then adjusting the settings over time as the system matures and experiences various loading conditions with respect to data, number of installed applications, and the number of nodes with which to interact. For example, with respect to SVM's that are well understood, SVM's are configured via a learning or training phase 30 within a classifier constructor and feature selection module. A classifier is a function that maps an input attribute vector, $x=(x1, x2, x3, x4, xn)$, to a confidence that the input belongs to a class — that is, $f(x)=confidence(class)$. In the case of management systems, for example, attributes are system parameters of desired states, and the classes are categories or areas of interest (e.g., all drives, all native process). Classifiers can also be employed to capture and analyze transaction logs, look for patterns, and diagnose a system by looking for successful and unsuccessful patterns.

Configuration health involves, for example, changing a queue size from five to ten, and determining what impact the change can have on the application, service, or system. The same applies for security and performance, where a classifier can be employed to monitor performance counters and make system changes accordingly to optimize performance. Security can also be monitored and analyzed for patterns, the impact of which can be used to suggest or alter security polices. Thus, it is to be appreciated that health is a broad concept that can be applied to many areas of the system. In a system-wide scope, performance can be good, but security could be poor. Thus, a holistic view that crosses many disciplines of the system is advantageous.

The desired states of the administrator can be expressed in the code, which is surfaced in the manifest and passed for monitoring by the monitoring service. The system can, based upon instructions in the manifest, monitor the application or service and alert the administrator when the application or service does not meet the performance, and based on the instructions, take corrective actions. For example, where a test setting for e-mail is not maintained, but falls below a threshold for a period of time, another machine can be added until the load subsides, and the network traffic can also be used as a trigger increasing the number of resources to handle the given load. A goal is automate as much a possible so that the administrator is involved only when manual action is required.

The model-based management system is composable. It is component based, with a component comprising most anything. Thus, the system can be reduced to its lowest manageable piece and composed back up. In a database, for example, there is the application, with instances, the database, tables, and stored procedures, and can be reduced as low as a single file. Consider a 401k application. The 401k application can depend on a database, a web sever, and the customer's own business logic, down to a database that depends on the operating system and associated. It is desirable to manage and report at the various levels. Applications are described through relationships between components. These relationships can express how an individual application is assembled (e.g., SQL server contains a service, instances, and databases), platform requirements (e.g., operating system and other applications), and communication to other components (the web server connecting to the SQL server). A single administrator may care about a database and a single machine, whereas a finance administrator may care about the 401k application, and the CIO cares about all of the applications and machines. The models, reporting, and desires states should process everything such that individual metrics can be referenced to determine if the system is doing what is expected.

All models are tied into a URI namespace, providing a standard way of navigating the system, enumerating all components installed, and asking the component what it provides, what is considered healthy, what events does it have, what error events occurred in the last day or hours, what configuration settings are included, what changes occurred in the last hour, etc.

Referring now to FIG. 7B, there are illustrated blocks associated with the manifest component 508 of the model-based management architecture. The manifest that ships with the application contains information from the models and source code attribution in a machine-readable form for use by management system services. Administrative tasks for an application are defined within the manifest. There can be a number of manifests generated that correspond to the models, including the following; a first manifest subcomponent 707 associated with component dependencies, relationships between the components, and service roles; a second manifest subcomponent 708 associated with events, probes, rules, and actions; a third manifest subcomponent 709 associated with settings and assertions; a fourth manifest subcomponent 710 associated with commands (i.e., cmdlets) and administrative roles; a fifth manifest subcomponent 711 associated with distributed environments; and a sixth manifest subcomponent 712 associated with deployment.

The manifest is the "bridge" between developer and, the operations team and the administrator, and is created automatically with a tool that sweeps the models for the attributed code. The component manifest 707 is used by a setup engine to determine how to install the application or service. It describes the logical components, files, where the files should be installed, and configuration settings (or any settings). Dependencies are what need to be defined before installation, and include various roles, so that the application can be installed in different modes, with varying degrees of security, and different operational profiles. The component manifest 707 makes it easier for the user and/or the system to know what to do manually and automatically. Manifest granularity can get down to one manifest per component.

Conventionally, many more files are installed than what are actually needed. The manifest allows installing only those files that are needed. This improves at least performance and security. Software dependencies are defined in the manifest 707. At the application level, the dependencies can be specific to a single machine and define component relationships and the hardware resources. A computer can be described by a manifest, for example, the application should be deployed on a dual-processor machine of a specific manufacturer, or interface to a 4-processor machine. This manifest 707 describes the processor, memory, drives, etc., to the level of hardware granularity needed for the implementation. Thus, management can be more proactive then reactive, as in conventional systems. A hard disk failure can be determined to be caused by thermal failure, for example, where the system temperature is monitored over time, and the power supply rail voltages are monitored, but found to be sufficient.

The health model 701 is used to spawn the health manifest 708. The health manifest 708 is populated from the health model 701 using attribution and other tools. Events are not called out in the model 701, but in a resource file. A tool sweeps the resource files and attributed source code, and populates the health manifest 708. Failure states can be detected by watching for a predefined sequence of events or monitoring performance counter thresholds. Instructions can be provided to the system as to how to address such failure states. The health model is transformed into rules. The health manifest 708 includes ruletype event sequences with parameters such as event1, event2, time3, etc.

The configuration model 702 describes what settings are included and is transformed into the settings and assertions manifest 709 that provides instruction schema for the system to create the settings when the component is installed.

The administrative task model 703 is transformed into actions via the cmdlets and administration roles manifest 710. For example, if a data backup is required, the cmdlet is the actual code or URI used to facilitate the backup task. Where numerous administration tasks need to be performed, the manifest 710 provides the URI path to the those commands and perhaps to the code. The cmdlet can be processed through assertion on the code or may require external code. The administration role is another abstraction supporting, for example, multiple classes of users that manage this application or service, and the level of control they each can exercise. This associates with role-based access. Metadata is required that describes the roles of the various users and their allowed capabilities. Roles cross all aspects of the system-who is allowed to install, who can change monitoring, who can look at health, who can resolve alerts, who can take these various actions, etc.

The task model 703 defines what the developer thinks the administrator should do, as expressed in the manifest 710, and customized by the operations teams for their environment. These customizations can be done at the class level and instance level. Changes can be made in the manifest at the class level, at the instance level, and changes can be made directly at runtime. A very powerful feature of the disclosed model-based management architecture is that capabilities can first be described at the class level, whereas at runtime, access is to the instance space.

The architecture model 704 surfaces the distributed components manifest 711 and the deployment manifest 712. Network connections between machines, hardware requirements, are covered here, for example. The deployment manifest 712 supports at least applications comprising web servers, middle tier servers, and database servers, and includes frontend/backend applications, network connectivity between the two applications, and describes the relationships between individual nodes. Deployment time creates instances of those described in the overall architecture model 704.

The performance and security models (705 and 706) each support corresponding manifests (not shown) that describe those related functions and operations.

Returning to the employment of machine-based learning, a classifier can be used to select and dynamically generate manifests of selected portions of the model code based on requirements during, for example, first deployment. Default models can be automatically generated using more attribution or less attribution. Over time, as system operational information becomes available, this information can be analyzed such that the level of granularity of the manifest can be adjusted to, for example, more closely monitor the system in specific areas based on the latest data trends and logs. The updated manifest is then regenerated and employed as needed to more closely monitor the application or service.

If a manifest describes the default installation or recommended best practices from the manufacturer, an administrator may want to change things. For example, with respect to health rules the administrator may want to change a threshold from thirty to forty, or install components, or override a security policy. This can be done by creating a customized version of the manifest to override the manifest bundled by the manufacturer. A different version can be detected during installation, allowing a user the option to select the default manifest or the custom manifest. Alternatively, there can be a separate file the system reads that lists the overrides, which are then displayed for selection by the user to be applied to the default manifest or during installation such that the default settings are overridden.

With respect to the distributed applications, the administrator can more generally stipulate that he or she wants three of these, four of that, and six of those, all wired in this configuration. The administrator may customize the deployment manifest 712 accordingly for the given environment.

Figure 7C:
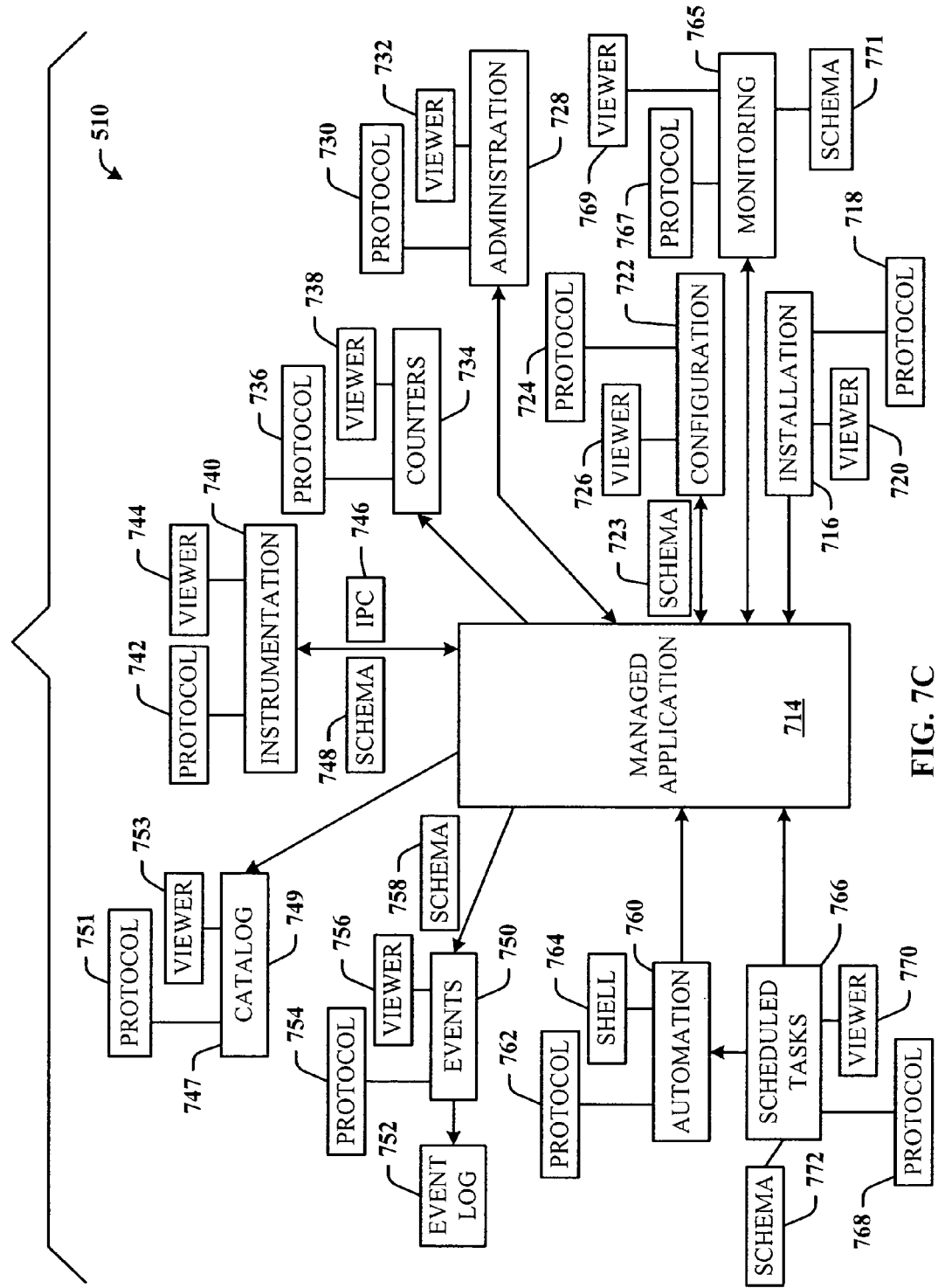
FIG. 7C illustrates a block diagram of core system APIs of the system component utilized for managing an application or service in accordance with the model-based management architecture.

Referring now to FIG. 7C, there is illustrated a block diagram of core system APIs of the system component 510 utilized for managing an application or service 714 in accordance with the model-based management architecture. The system component 510 includes the application or service 714 that is to be managed. The system 510 includes a number of APIs in cooperative communication for facilitating the model-based management. The system 510 is comprised of multiple services that are configured by information within an application manifest (described with respect to FIG. 7B).

The system 510 consists of the services necessary to ensure availability of an application and uses the desired states expressed in the manifest component 508 and modified by the administrator to perform the following: installation to verify dependencies and install only the necessary files, settings, and security; event subscriptions, to subscribe to events and to forward as specified; polled instrumentation to periodically collect instrumentation and counters; and, synthetic transactions or simulating user transactions. One of the best ways to determine if an application is available and performing as expected (the desired state) is for the monitoring system to use the application as if it were a user. This is active monitoring. A potential second way is active monitoring of real user transactions, and reporting aggregate data up to the system for analysis. These steps close the loop and show that internal application data is not sufficient. Model-based management also works outside the application.

The system 510 uses the desired states expressed in the manifest component 508 to also perform task scheduling for automatic task management; role-based access to restrict access to program functions; monitoring to detect problems, diagnose root causes, take corrective actions, and notify the system administrator when intervention is necessary; and, central configuration to customize policy for the above and apply to many machines.

There is provided an installation API 716 in communication with the application 714 to facilitate installation of the application, application updates, and patches. The installation API 716 takes the manifest assemblies via the code and instantiates the assemblies, by instructing the system to install this component, this manifest, and this version, on this machine. The installation API 716 has associated therewith a protocol 718 and a viewer 720. The protocol 718 facilitates communicating API-related data with other components of the system 510. The viewer 720 displays data related to the installation API 716. The installation API 716 not only facilitates installation on a single machine, but also for distributed applications or services involving both local and remote systems, as well as for hardware provisioning and abstraction. For a distributed data center environment, it is important to be able to abstract the hardware system generally, and to a finer granularity, to a specific machine abstraction. A protocol, as contemplated herein with respect to an API, is the rules that govern the transmission and receipt of that API-related data. The viewer 720, as understood in this description, is a program that displays data related to the API, here the installation API 716. The API data includes but is not limited to sound files, video files, for example, and other types of data files.

The system 510 includes a configuration API 722 in communication with the application 714 to facilitate configuring the application 714. The configuration API 722 has associated therewith a schema 723, a protocol 724 and a viewer 726. The schema 723 defines the structure and contents of the data passed between the API 722 and the application 714. The protocol 724 facilitates communicating API-related data with other components of the system 510. The viewer 726 displays data related to the configuration API 722.

There is also included an administration API 728 that facilitates many-to-one administration for distributed environments. The API 728 communicates with the managed application 714 and also remote systems (not shown). The API 728 has an associated protocol 730 and a viewer 732.

The system 510 includes a performance counter API 734 in communication with the application 714 to facilitate tracking counter variables that are used in managing the application 714. The counter API 734 has associated therewith a protocol 736 and a viewer 738. The protocol 736 facilitates communicating API-related data with other components of the system 510. The viewer 738 displays data related to the counter API 734. Performance counters are exposed by the application 714 and publishes the counters through the viewer 738.

There is provided an instrumentation API 740 in communication with the application 714 to facilitate configuring instrumentation and the passing of instrumentation data with the application 714. The instrumentation API 740 has associated therewith a protocol 742 and a viewer 744 through which the instrumentation is exposed. The protocol 742 facilitates communicating API-related data with other components of the system 510. The viewer 744 displays data related to the instrumentation API 740. The instrumentation API 740 communicates with the managed application 714 via IPC (InterProcess Communication) 746. IPC is the automatic exchange of data between one program and another, either within the same computer or over a network. One example of an IPC function is performed when a user manually cuts and pastes data from one file to another using a clipboard. The counters are always published via shared memory, while the instrumentation is delivered on demand. The instrumentation API 740 also includes a schema 748 that describes the surface of the instrumentation classes in manner similar to an events schema. There may also be included an instrumentation log (not shown); however, many administrators prefer to utilize an event log.

The system 510 includes a catalog 747 that is the store that keeps track of and caches component and mode information. This mode information comes from the manifests at install and, parts are dynamic and updated at runtime. The catalog 747 includes a catalog API and provides access to events, counters, instrumentation, and configuration data, to name just a few types of the data stored therein. Access to the catalog 747 is facilitated by a protocol 751 and viewer 753. A central configuration database contains a rolled up or aggregate view of the catalog across multiple managed nodes.

The system 510 includes an events API 750 in communication with the application or service 714 to facilitate implementing and tracking events that are used in managing the application 714. The events API 750 interfaces to an event log 752 that serves as a store for all events that occur. The events API 750 has associated therewith a protocol 754 and a viewer 756. The protocol 754 facilitates communicating API-related data with other components of the system 510. The viewer 756 displays data related to the events API 750. Communications with the application 714 is in accordance with an events schema 758 that defines the structure and contents of the data passed therebetween. The events are published as they are described or happen. The schema describes the surface of the event.

The system 510 includes an automation API 760 in communication with the application 714 to facilitate automating procedures that might normally be done interactively with the application 714. The automation API 760 has associated therewith a protocol 762 and a shell 764. The protocol 762 facilitates communicating API-related data with other components of the system 510. The shell 764 provides a user interface to the automation API 760 to facilitate user interaction therewith for entering and displaying data related to the automation processes and user control of the automation processes.

The system 510 further includes a scheduled tasks API 766 in communication with both the application 714 and the automation API 766. The scheduled tasks API 766 facilitates scheduling jobs or programs for at least the automation API 760 and the managed application 714. It maintains a list of jobs to be run and allocates resources accordingly. The scheduled tasks API 766 has associated therewith a protocol 768 and a viewer 770. The protocol 768 facilitates communicating API-related data with other components of the system 510. The viewer 770 displays data related to the scheduled tasks API 766. A task schema 772 defines the structure and contents of the data passed between the tasks API and other components.

Automation and tasks data is received from the task and cmdlets models. These features can be automated through the management shell either locally or remotely. The scheduling system can run these, e.g., a backup at 3 AM.

Figure 7D:
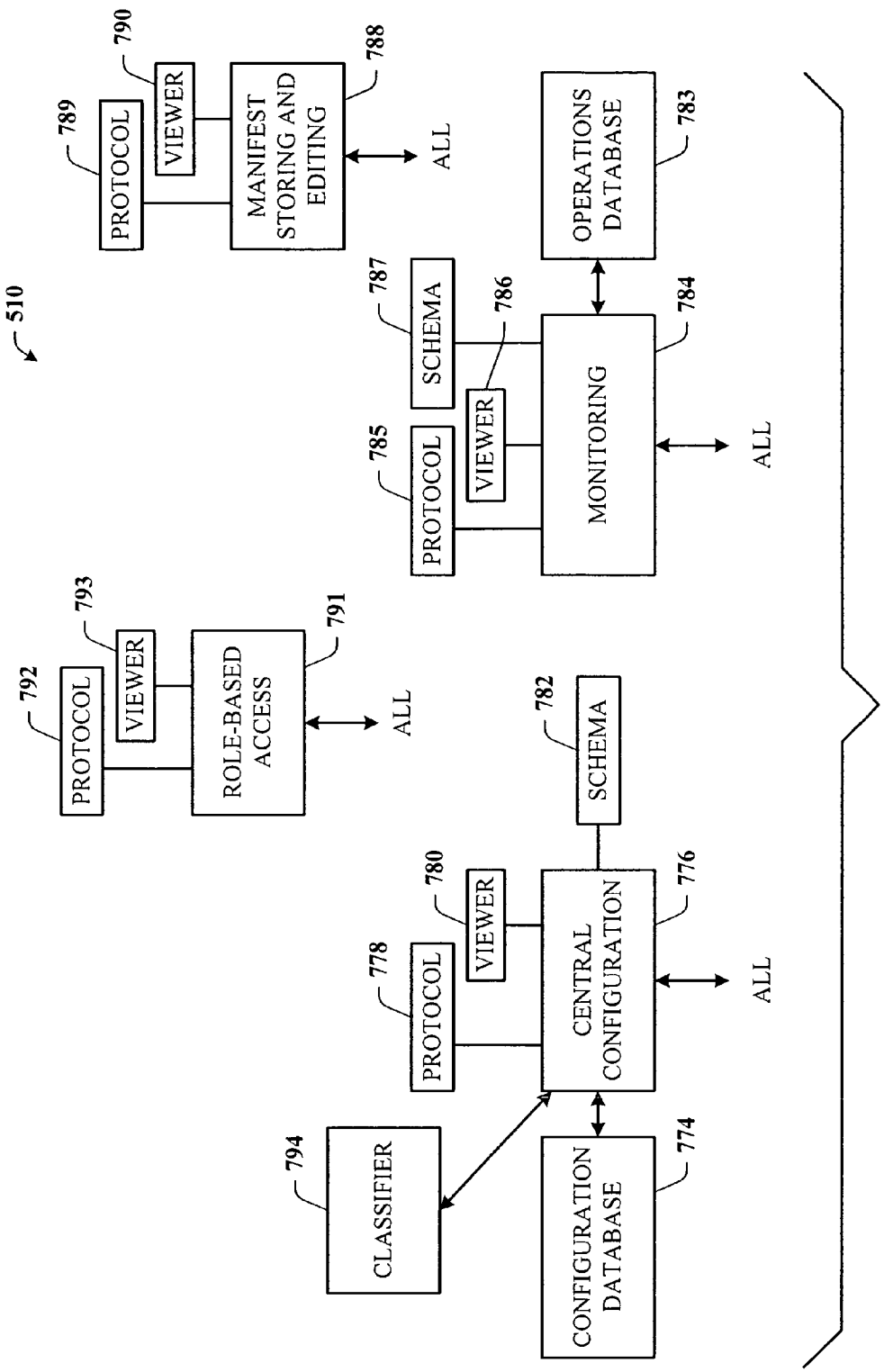
FIG. 7D illustrates a block diagram of management-related APIs of the system component of the model-based management architecture.

It is to be appreciated that components described in FIG. 7C can represent those of a local implementation, while the components of FIG. 7D can represent those associated with a distributed implementation such that analysis occurs across many machines and software systems. Thus, in a distributed implementation, the components of FIG. 7D communicate with at least one of the local systems of FIG. 7C, but typically a plurality of such local implementations in a wired and/or wireless regime. In the local implementation, the system 510 can also include any or all of the components of FIG. 7D, including a local monitoring service API 765. The local monitoring service API 765 also includes a protocol 767, a viewer 769, and schema 771, each of which facilitates functionality similar to such components of other APIs. In a distribute implementation, the local monitoring service 765 then passes monitoring information to the distributed monitoring service, described hereinbelow.

Referring now to FIG. 7D, there is illustrated a block diagram of management-related APIs of the system component 510 of the model-based management architecture. There is provided a configuration database subcomponent 774 to which access and control is provided via a central configuration API 776. The central configuration API 776 interfaces with all subcomponents of the system 510, and has associated therewith a protocol 778 and a viewer 780 for communication and interaction and, a schema component 782 that describes the shape of the configuration settings and attributes, such as assertions and default values. The protocol 778 facilitates communicating API-related data with other components of the system 510.

There is also provided an operations database subcomponent 783 that serves as a repository for operations-related data of the management system, e.g., reporting, current state, and historical data. A monitoring API 784 interfaces to the operations database 783 and all subcomponents of the model-based management system, and further has associated therewith a protocol 785, a viewer 786, and a schema 787. The protocol 785 facilitates communicating API-related data with other components of the system 510. The viewer 786 displays data related to the monitoring API 784. The schema 787 provides the definition for the entire operations database 783 at least with respect to the structure and type of contents that each data element within the structure can contain.

Central configuration can touch all of the APIs, and is used by the administrator to set configuration details, which can include details for the distributed application scenario, such as on what machines should the application be installed. Configuration also includes monitoring configuration. For example, all machines must exhibit no less than 80% CPU utilization for five minutes. Thus, the monitoring system uses the configuration system. Monitoring is how the administrator ensures via the management system that the application is behaving, configured, and installed per the model. It also includes ensuring expected functionality, the desired amount of security, performing properly, and delivery the data as expected for the users. Thus, monitoring crosses all of those domains. The general process is to install, configure, run tasks on demand, consume events, provide instrumentation, configuration, and store data and results. The health manifest provides the working instructions to the monitoring system in the form of rules that are the instructions to the monitoring system. In general, the manifest contains the runtime instructions, and the runtime implements the desired state.

The monitoring service is both a local service, as well as a central or distributed mechanism. For a distributed implementation, health includes that of the local machine as well as the relationships between the local and remote machines. For example, given a cluster of ten machines, as long as six are functioning properly, the system is considered to be healthy. However, if no more than five machines are running, the system health status degrades to a cautionary state. If no more than four machines are running, the system health can be considered in a failure state. Hardware abstraction facilitates bringing one or more backup systems or applications/services online if one or more cluster machines fail or go offline. Thus, a pool of idle or shared resources can be controlled based upon instructions. This feature is particularly useful in a data center environment. Automated actions can be implemented to ensure that the system maintains optimum or at least a minimum functionality.

One aspect of the model-based management architecture allows a developer to author a large number of rules that express criteria that must be met for a system to be considered healthy. The monitoring API 784 includes a rules runtime engine that facilitates implicit concurrent processing of the rules. The rules engine receives input instructions that express the rules as an intermediate form, which rules are expressed using a rules definition language (RDL). The rules engine also receives configuration data from the configuration database 774 that is used to instantiate the rule code. A translator reads the input instructions and transforms them into a parallel execution form. The runtime engine reads the translated instructions and facilitates parallel execution. The rule code is instantiated by loading the configuration data into the runtime engine that specifies which rules to run, as well as the parameters required to run the rule. Rule parameters can be changed at runtime, such as enabling rules that have a heavy system impact only when a problem has been detected. Thus, the rules are dynamic, as well as thresholds, that also can be changed accordingly. The monitoring API 784 also connects to all subcomponents of the system 510.

There is also provided a manifest storing and editing service 788 for use by the administrator. The manifest service 788 has associated therewith a protocol 789 and a viewer 790 to expose these manifest functions to the administrator. The manifest service 788 feeds the manifests to the administrator via the protocol 789 and viewer 790, allowing the administrator to view and change the manifests before installation. The manifest service 788 also facilitates versioning of the manifests according to updates and customizations.

There is also provided a role-based access API 791 that interfaces to all subcomponents of the model-based management system, and further has associated therewith a protocol 792 and a viewer 793. The protocol 792 facilitates communicating API-related data with other components of the system 510. The viewer 793 displays data related to the role-based API 791. This API 791 is illustrated at a level above the monitoring and configuration components to provide overall administration of access to the various components and aspects of the model-based management system. It is not necessary that the role-based access API 791 include the protocol 792 and a viewer 793, since these functions can be facilitated by other components of the system 510.

The system also includes the classifier 794 for machine-based learning and control. As indicated hereinabove, the classifier 794 can be employed in many ways to enhance system performance and health, to name just a few. To facilitate machine-based learning, the classifier 794 interfaces with central configuration service 776 such that all components of the system may be accessed and its data used.

Figure 7E:
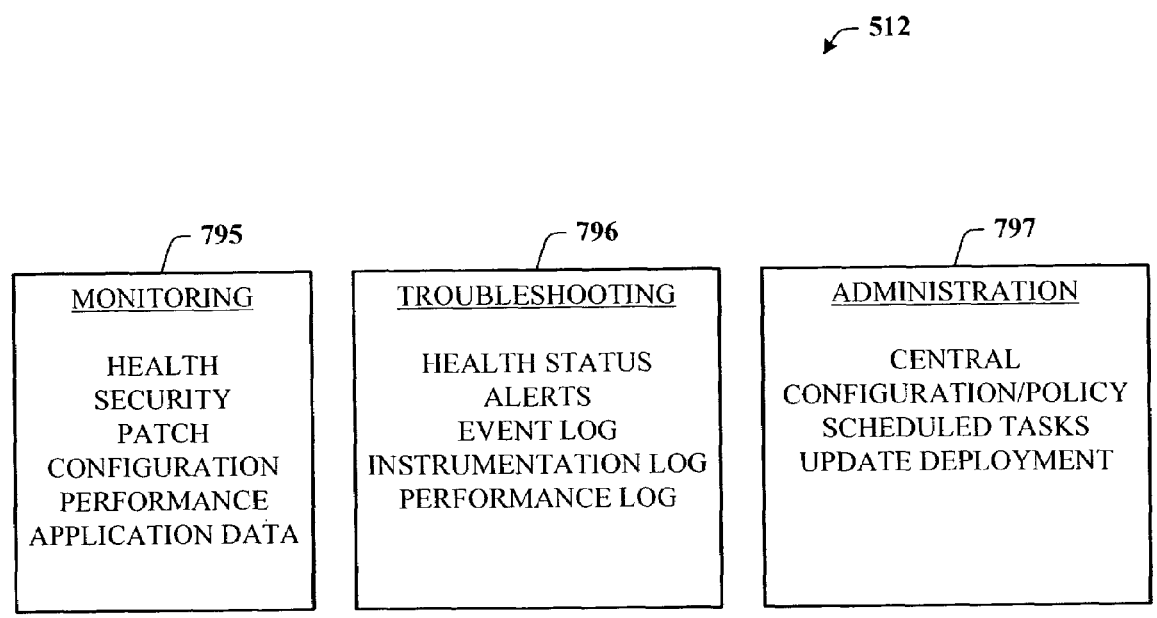
FIG. 7E illustrates principal subcomponents of the tasks component of the model-based management architecture.

Referring now to FIG. 7E, there is illustrated principal subcomponents of the tasks component 512 of the model-based management architecture. The tasks are described through the administration task model. The tasks fall into three subcomponents: a monitoring subcomponent 795, a troubleshooting subcomponent 796, and an administration subcomponent 797.

The tasks for the monitoring subcomponent 795 include overseeing health, security, patches, configuration, performance, and application data. The tasks for the troubleshooting subcomponent 796 include diagnosing a health state, processing alerts, and updating event, instrumentation, and performance logs. The tasks of the administration subcomponent 797 include central configuration/policy, scheduling, and update deployment. Administration includes not only management of a single system by also managing many machines, applications, and systems, policies, backup times, changes, and updates, for example.

URIs are employed in the model-based management architecture to uniquely identify abstract or physical resources or collections of resources. A schema for a resource can be identified by the URI with a placeholder for the resource. The URI with placeholder is called a URI template. The catalog of the system relies on URI templates to describe instrumentation without referring to specific instances. URI templates allow probes to be identified and their characteristics understood without actually retrieving the probe for a particular instance. Protecting the capability to predefine instrumentation separately from instances makes the deployment and authoring of rules easier and the associated operating system manageable.

The model-based management framework employs the RDL to enable defining of rules for the purpose of monitoring the availability of software and hardware. Rules written in RDL are executed by the runtime engine as part of the monitoring service. The purpose of the RDL is to test assertions, enforce constraints using runtime information, make inferences, perform correlation, and communicate results of dynamic tests to other components. The RDL defines the rule type (i.e., class) while a separate XML (eXtensible Markup Language) document is used to create instances of the rule type by specifying the parameter values necessary for its instantiation. There is a schema for describing the sequence of steps the system should take for problem detection, diagnosis, resolution, verification, and alerting. This is what is described in the model, expressed in the manifest, and executed/managed by the monitoring system.

The model-based management framework employs events and update values of performance counters to indicate a health model (or status) of services, and tests or synthetic transaction, as indicated earlier. The health model 701 is a graphical and/or textual representation of how a service or component may fail, which helps an administrator to understand the significance of various events and performance counters of the service, and efficiently decide whether to take any action based on the observed instrumentation data. A developer builds the health model 701 with the corresponding files then generated from the model and source code attribution.

The health model 701 includes a description of the component relationships, in addition to the dependencies. Depending upon the context of a detected problem, the system can walk the relationship tree and attempt to determine root cause based upon the health of other components. This approach is backed by the model and manifest.

Figure 8:
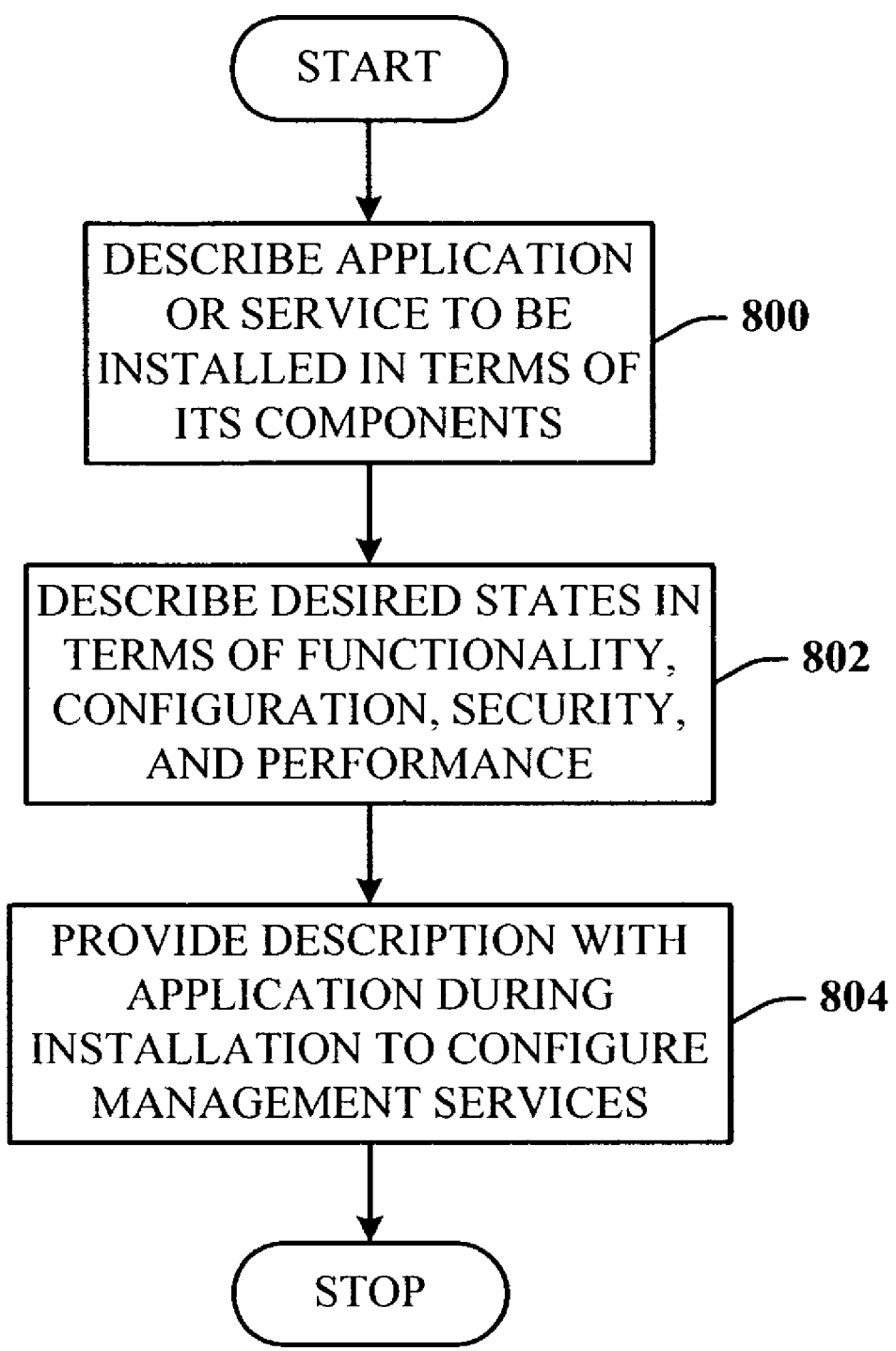
FIG. 8 illustrates a flow chart of a process of model-based management.

Referring now to FIG. 8, there is illustrated a flow chart of a process of model-based management. At 800, the application or service to be installed is described in terms of its components. At 802, the application or service is described in the desired states in terms of functionality, configuration, security, and performance. At 804, the description is provided along with the application or service during installation, such that the description is used by the system to configure management services of the system. The process then reaches a Stop block.

Figure 9:
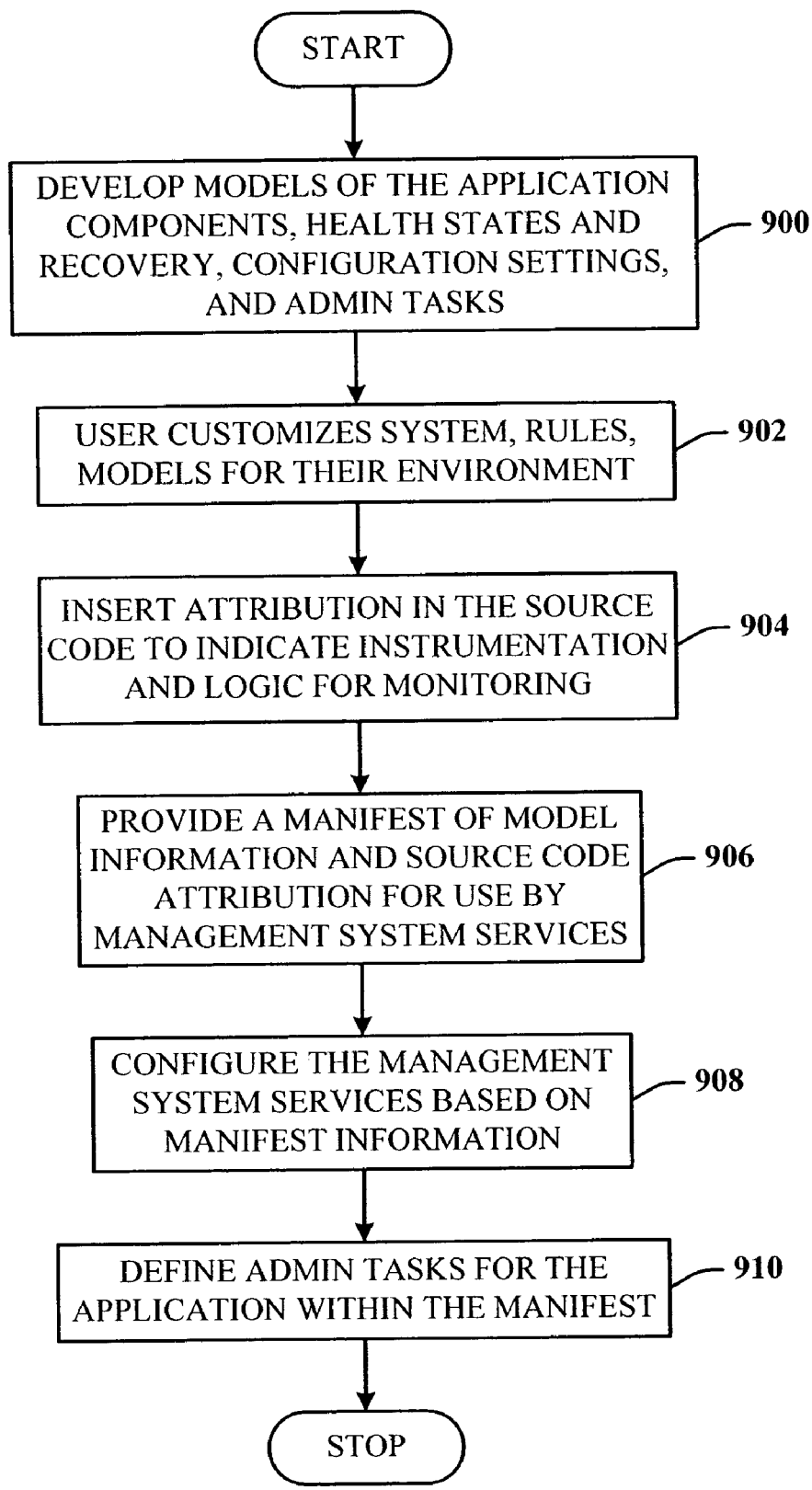
FIG. 9 illustrates a more detailed flow chart of a process of implementing the model-based management.

Referring now to FIG. 9, there is illustrated a more detailed flow chart of a process of implementing the model-based management. At 900, models are developed for the application components, health states and recovery, configuration settings, and admin tasks. At 902, a user customizes the system/rules/models according to the environment. At 904, attribution is inserted into the source code to indicate instrumentation and logic for monitoring. At 906, a manifest is provided of model information and source code attribution for use by the management system services. The manifest is provided for use by the management system services in machine-readable form. At 908, one or more of the management system services are configured based on the manifest information. At 910, administrative tasks are defined for the application within the manifest such as registering cmdlets with the system, setting up schedules, etc. The process then reaches a Stop block.

Figure 10:
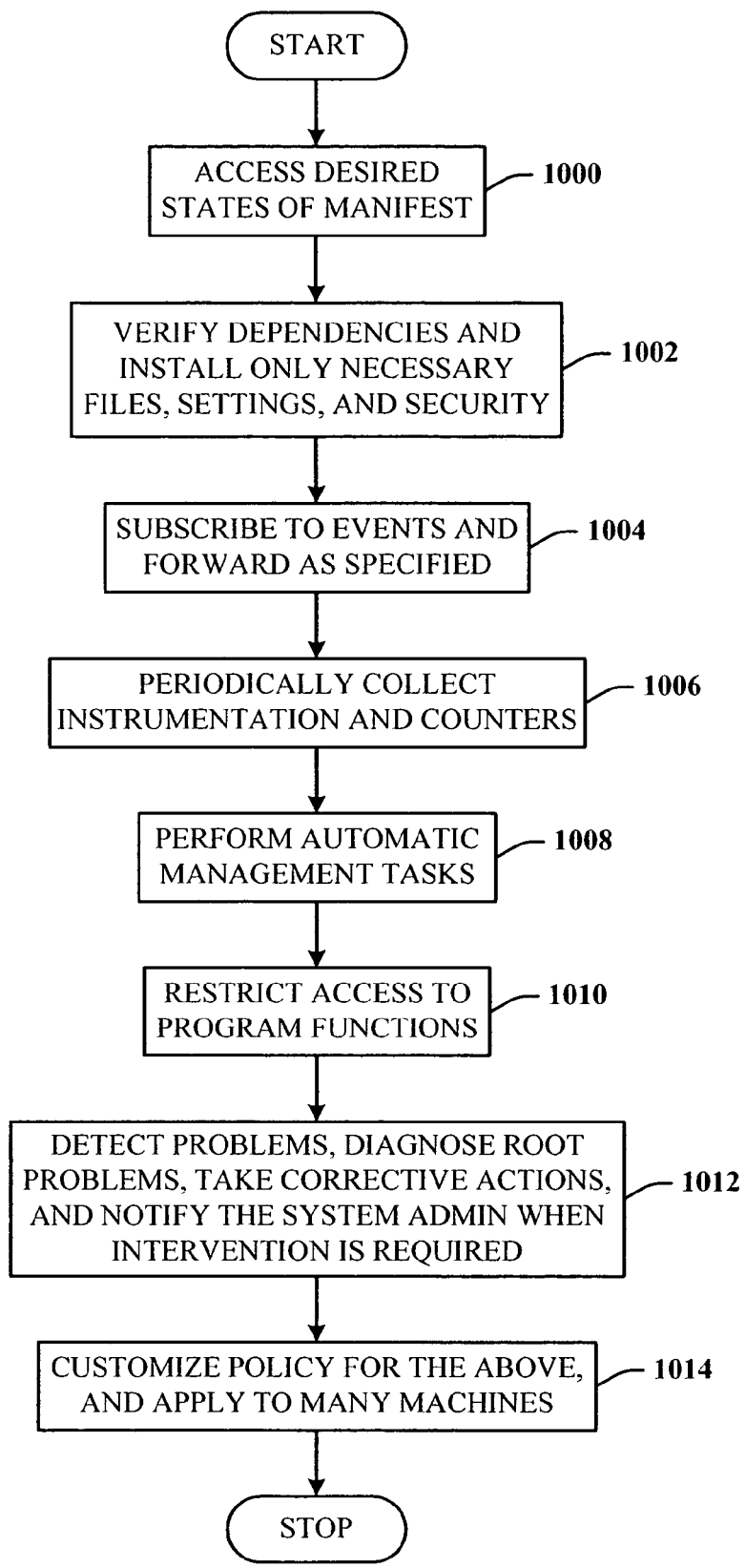
FIG. 10 illustrates a flow chart of a process of implementing desired states of the model-based management.

Referring now to FIG. 10, there is illustrated a flow chart of a process of implementing desired states of the model-based management. At 1000, the desired states are accessed from the manifest. At 1002, dependencies are verified and only the necessary files, settings, and security features are installed. At 1004, events are subscribed to and forwarded, as specified in the manifest. At 1006, instrumentation data and counter data is collected periodically, as well as tests and synthetic transactions performed. At 1008, automatic management tasks are performed. At 1010, access is restricted to program functions. However, this does not need to be included to facilitate model-based management. At 1012, problems are detected, root problems diagnosed, corrective actions taken, and the system administrator notified when to intervene. At 1014, policies for all of the above are customized for application to many other types of machines and systems. The process then reaches a Stop block.

Figure 11:
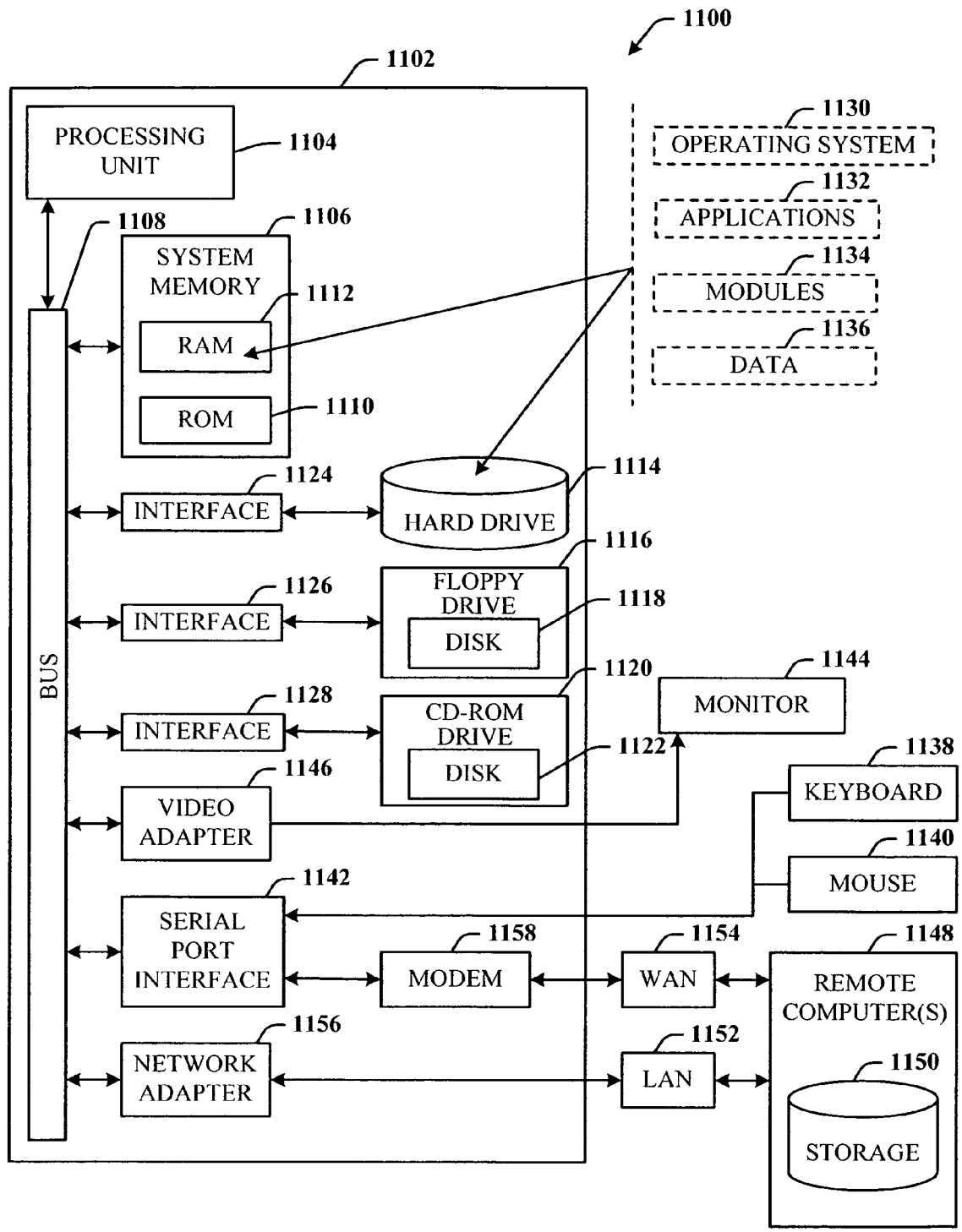
FIG. 11 illustrates a block diagram of a computer operable to execute the disclosed architecture.

Referring now to FIG. 11, there is illustrated a block diagram of a computer operable to execute the disclosed architecture. In order to provide additional context for various aspects of the present invention, FIG. 11 and the following discussion are intended to provide a brief, general description of a suitable computing environment 1100 in which the various aspects of the present invention may be implemented. While the invention has been described above in the general context of computer-executable instructions that may run on one or more computers, those skilled in the art will recognize that the invention also may be implemented in combination with other program modules and/or as a combination of hardware and software. Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

With reference again to FIG. 11, there is illustrated an exemplary environment 1100 for implementing various aspects of the invention that includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 may be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes a hard disk drive 1114, a magnetic disk drive 1116, (e.g., to read from or write to a removable disk 1118) and an optical disk drive 1120, (e.g., reading a CD-ROM disk 1122 or to read from or write to other high capacity optical media such as Digital Video Disk (DVD)). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The drives and their associated computer-readable media provide nonvolatile storage of data, data structures, computer-executable instructions, and so forth. For the computer 1102, the drives and media accommodate the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, cartridges, and the like, may also be used in the exemplary operating environment, and further that any such media may contain computer-executable instructions for performing the methods of the present invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112.

It is appreciated that the present invention can be implemented with various commercially available operating systems or combinations of operating systems.

A user can enter commands and information into the computer 1102 through a keyboard 1138 and a pointing device, such as a mouse 1140. Other input devices (not shown) may include a microphone, an IR remote control, a joystick, a game pad, a satellite dish, a scanner, or the like. These and other input devices are often connected to the processing unit 1104 through a serial port interface 1142 that is coupled to the system bus 1108, but may be connected by other interfaces, such as a parallel port, a game port, a universal serial bus ("USB"), an IR interface, etc. A monitor 1144 or other type of display device is also connected to the system bus 1108 via an interface, such as a video adapter 1146. In addition to the monitor 1144, a computer typically includes other peripheral output devices (not shown), such as speakers, printers etc.

The computer 1102 may operate in a networked environment using logical connections via wired and/or wireless communications to one or more remote computers, such as a remote computer(s) 1148. The remote computer(s) 1148 may be a workstation, a server computer, a router, a personal computer, portable computer, microprocessor-based entertainment appliance, a peer device or other common network node, and typically includes many or all of the elements described relative to the computer 1102, although, for purposes of brevity, only a memory storage device 1150 is illustrated. The logical connections depicted include a local area network (LAN) 1152 and a wide area network (WAN) 1154. Such networking environments are commonplace in offices, enterprise-wide computer networks, intranets and the Internet.

When used in a LAN networking environment, the computer 1102 is connected to the local network 1152 through a wired or wireless communication network interface or adapter 1156. The adaptor 1156 may facilitate wired or wireless communication to the LAN 1152, which may also include a wireless access point disposed thereon for communicating with the wireless adaptor 1156. When used in a WAN networking environment, the computer 1102 typically includes a modem 1158, or is connected to a communications server on the LAN, or has other means for establishing communications over the WAN 1154, such as the Internet. The modem 1158, which may be internal or external and a wired or wireless device, is connected to the system bus 1108 via the serial port interface 1142. In a networked environment, program modules depicted relative to the computer 1102, or portions thereof, may be stored in the remote memory storage device 1150. It will be appreciated that the network connections shown are exemplary and other means of establishing a communications link between the computers may be used.

The computer 1102 is operable to communicate with any wireless devices or entities operably disposed in wireless communication, e.g., a printer, scanner, desktop and/or portable computer, portable data assistant, any piece of equipment or location associated with a wirelessly detectable tag (e.g., a kiosk, news stand, restroom), and telephone. This includes at least Wi-Fi and Bluetooth™ wireless technologies. Thus the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11 b) or 54 Mbps (802.11 a) data rate or with products that contain both bands (dual band), so the networks can provide real-world performance similar to the basic 10BaseT wired Ethernet networks used in many offices.

Figure 12:
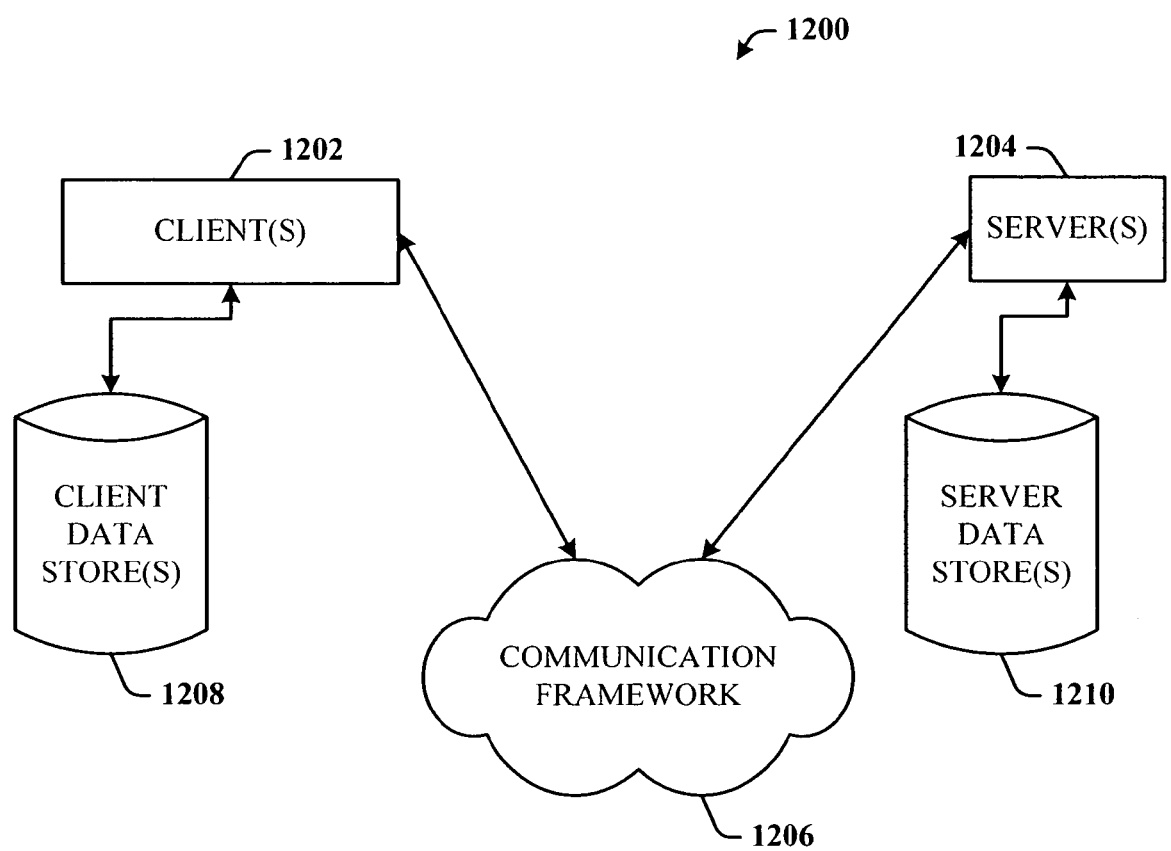
FIG. 12 illustrates a schematic block diagram of an exemplary computing environment in accordance with the present invention.

Referring now to FIG. 12, there is illustrated a schematic block diagram of an exemplary computing environment 1200 in accordance with the present invention. The system 1200 includes one or more client(s) 1202. The client(s) 1202 can be hardware and/or software (e.g., threads, processes, computing devices). The client(s) 1202 can house cookie(s) and/or associated contextual information by employing the present invention, for example. The system 1200 also includes one or more server(s) 1204. The server(s) 1204 can also be hardware and/or software (e.g., threads, processes, computing devices). The servers 1204 can house threads to perform transformations by employing the present invention, for example. One possible communication between a client 1202 and a server 1204 may be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications may be facilitated via a wired (including optical fiber) and/or wireless technology. The client(s) 1202 are operably connected to one or more client data store(s) 1208 that can be employed to store information local to the client(s) 1202 (e.g., cookie(s) and/or associated contextual information). Similarly, the server(s) 1204 are operably connected to one or more server data store(s) 1210 that can be employed to store information local to the servers 1204.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system embodied on a computer readable storage medium that when executed on one or more processors facilitate processing rules, comprising:
    a translator component that translates synchronous statements to asynchronous instructions using a synchronous programming model;
    a runtime engine that reads the translated instructions and facilitates efficient scheduling and parallel processing of the translated instructions;
    in which the instructions insert periodic yield instructions into the statements to facilitate at least one of yielding to runtime rule code execution switching and calling a utility function provided by the processors, and
    in which the translated instructions are scheduled for processing based upon a polling structure, which processing occurs for at least one of the polling structure of a current frame and the polling structure at the top of a stack.

2. The system of claim 1, the statements are organized into a series of rule types.

3. The system of claim 2, the rule types express logic that determines the desired state of a target resource.

4. The system of claim 3, in response to a desired state, and action is taken.

5. The system of claim 1, the translator component facilitates instantiation of the asynchronous instructions.

6. The system of claim 1, the instructions facilitate maintaining all states by the runtime engine, which states include at least one of arguments and local variables.

7. The system of claim 1, the translator component facilitates depth-first traversal to generate at least one of labels and temporary variables for corresponding nodes.

8. The system of claim 1, the translator component translates modules of the rules into classes.

9. The system of claim 1, the instruction includes an address code representation to facilitate context switching by the runtime engine.

10. The system of claim 9, the address code representation employs at least three address codes, which representation is used when a statement or expression includes an asynchronous call.

11. The system of claim 1, the instructions are translated into a series of instruction blocks that are separated into switch-case blocks.

12. The system of claim 11, instructions within the instruction block are executed as a unit, and yield to runtime execution only between such instruction blocks.

13. The system of claim 11, the series of instruction blocks has associated therewith an update identifier that maintains which instruction block of the series is to be executed next upon reentry into the rule.

14. A system embodied on a computer readable storage medium that when executed on one or more processors facilitates concurrent processing of rules comprising:
    a translator component that translates the rules into instructions for concurrent processing;
    a runtime engine that schedules the instructions for processing and processes some or all of the instructions concurrently according to the schedule, and
    means for injecting yield instructions into the rule to facilitate at least one of: yielding execution of the rule to rule code execution switching during processing by the runtime engine, and to facilitate calling utility functions provided by the runtime engine
    the instructions are translated and scheduled for processing based upon a polling structure, which processing occurs for at least one of the polling structure of a current frame and the polling structure at the top of a stack.

15. The system of claim 14, the runtime engine facilitates implicit concurrent processing of the rules.

16. The system of claim 14, the runtime engine receives both the instructions and configuration data, which configuration data specifies at least one of which rules to run and the parameters required to run the rule.

17. A system embodied on a computer readable storage medium that when executed on one or more processors facilitates processing rules in a model-based management architecture, comprising:
    a plurality of rules that express health criteria for the architecture;
    a translator component that translates the rules into asynchronous instructions for concurrent processing; and
    a runtime engine that schedules the translated instruction for processing by injecting periodic yield instructions into the rules to facilitate at least one of: yielding execution of the rule to rule code execution switching during processing by the runtime engine, and to facilitate calling utility functions provided by the runtime engine and processes some or all of the instructions concurrently according to the schedule, wherein the runtime engine schedules execution of an execution stack based on a polling structure for the current frame or the polling structure that is at the top of the execution stack.

18. The system of claim 17, the runtime engine operates according to one of the instructions that suspends processing of code and waits for an event to occur, in response to which processing of the code is resumed and allowed to act on the event.

19. The system of claim 17, one of the plurality of rules invokes another rule.

20. The system of claim 17, the instruction component includes a language that facilitates looping, such that prior to jumping, a rule returns to the runtime engine to facilitate non-pre-emptive scheduling.

21. The system of claim 17, the translated instructions facilitate cooperative multitasking so that an execution state of a function is preserved, and constituted at a later time.

22. The system of claim 17, the instruction facilitate constructing a call frame, which call frame includes at least one of a function parameter, current instruction block, current function, and local variable.

23. The system of claim 17, the runtime engine includes a spreading algorithm that spreads execution of tasks over a duration of time beginning from an arbitrary time to reduce over-utilization.

24. A computer system embodying the system of claim 17.

25. A method of processing rules, comprising:

receiving a plurality of the rules;

translating the rules into instructions for communication to a runtime engine;

scheduling the translated instructions for processing by the runtime engine;

processing at least two of the plurality of instructions concurrently with the runtime engine;

receiving configuration data into the runtime engine to instantiate the rules;

injecting yield instructions into the rule to facilitate yielding execution of the rule to rule code execution switching during processing by the runtime engine, and to facilitate calling utility functions provided by the runtime engine; and scheduling the translated instructions for processing based upon a polling structure, which processing occurs for at least one of the polling structure of a current frame and the polling structure at the top of a stack.

26. The method of claim 25, the translated instructions are translated into a series of instruction blocks, wherein commencement of execution of the instruction block causes the instruction block to be executed in its entirety before yielding to the runtime engine.

27. The method of claim 25, further comprising during a startup process, building a task list of rules marked for execution by the runtime engine at startup, and spreading out initiation of the rules in batches such that each batch of rules is scheduled for processing within a time configured time interval.

28. The method of claim 27, further comprising configuring the time interval based upon predetermined criteria, which criteria includes a number of processors utilized by the computer.

29. The method of claim 25, the instructions are scheduled for processing in batches by the runtime engine, such that rules of a batch are scheduled for processing uniformly over associated time interval for processing the batch.

30. The method of claim 25, scheduling is performed according to a non-preemptive scheduling regime.

31. A system embodied on a computer readable storage medium that when executed on one or more processors for processing rules, comprising:

means for receiving a plurality of the rules;

means for converting the rules into instructions;

means for translating the instructions for processing by a runtime engine;

means for scheduling and processing concurrently at least two of the plurality of instructions;

means for injecting yield instructions into the rule to facilitate yielding execution of the rule to rule code execution switching during processing by the runtime engine, and to facilitate calling utility functions provided by the runtime engine; and means for scheduling the translated instructions for processing based upon a polling structure, which processing occurs for at least one of the polling structure of a current frame and the polling structure at the top of a stack.

32. The system of claim 31, the means for converting includes means for inserting control relinquishment code into the rule that determines where to relinquish control of the associated translated instruction during execution thereof, which relinquishment code is associated with a stack frame that contains at least one of parameters, local variables, and where in the translated instruction to jump upon reentry.

33. The system of claim 31, further comprising means for task switching between rules, where the translated instructions includes call frames to facilitate task switching.

34. A computer-readable medium having computer-executable instructions for performing concurrent processing of rules, comprising:

a translator component that translates synchronous rule statements into asynchronous instructions using a synchronous programming model;

in which instructions facilitate calling utility functions and yielding to runtime code execution switching of the runtime engine;

wherein the instructions inject yield instructions into the rule to facilitate yielding execution of the rule to rule code execution switching during processing by the runtime engine, and to facilitate calling utility functions provided by the runtime engine and the instructions are translated for processing based upon a polling structure, which processing occurs for at least one of the polling structure of a current frame and the polling structure at the top of a stack.

35. The system of claim 1, wherein the instructions are scheduled for processing in batches by the runtime engine, such that rules of a batch are scheduled for processing uniformly over associated time interval for processing the batch.

* * * * *